(12) United States Patent
Zhang et al.

(10) Patent No.: US 11,994,726 B2
(45) Date of Patent: May 28, 2024

(54) OPTICAL MODULE

(71) Applicant: HISENSE BROADBAND MULTIMEDIA TECHNOLOGIES CO., LTD., Shandong (CN)

(72) Inventors: Honghao Zhang, Shandong (CN); Benzheng Dong, Shandong (CN); Yifan Xie, Shandong (CN); Kai Liu, Shandong (CN); Qinhao Fu, Shandong (CN); Dan Li, Shandong (CN); Tengfei Wang, Shandong (CN)

(73) Assignee: HISENSE BROADBAND MULTIMEDIA TECHNOLOGIES CO., LTD., Shandong (CN)

( * ) Notice: Subject to any disclaimer, the term of this patent is extended or adjusted under 35 U.S.C. 154(b) by 126 days.

(21) Appl. No.: 17/853,792

(22) Filed: Jun. 29, 2022

(65) Prior Publication Data

US 2022/0326456 A1    Oct. 13, 2022

Related U.S. Application Data

(63) Continuation of application No. PCT/CN2021/100998, filed on Jun. 18, 2021.

(30) Foreign Application Priority Data

Dec. 14, 2020 (CN) .......................... 202011466271.8
Dec. 14, 2020 (CN) .......................... 202011475053.0
Dec. 14, 2020 (CN) .......................... 202011475117.7

(51) Int. Cl.
*H04B 10/00* (2013.01)
*G02B 6/42* (2006.01)
*H04B 10/40* (2013.01)

(52) U.S. Cl.
CPC ......... *G02B 6/4246* (2013.01); *G02B 6/4269* (2013.01); *G02B 6/4292* (2013.01); *H04B 10/40* (2013.01)

(58) Field of Classification Search
CPC .. G02B 6/4246; G02B 6/4269; G02B 6/4292; G02B 6/29367; G02B 6/4215; H04B 10/40
See application file for complete search history.

(56) References Cited

U.S. PATENT DOCUMENTS 8,724,955 B2 * 5/2014 LaVoie ............... H01R 13/6335
385/134
9,419,717 B2 * 8/2016 Huang ................. H04B 10/506
(Continued)

FOREIGN PATENT DOCUMENTS

CN           204405902 U      6/2015
CN           108873197 A     11/2018
(Continued)

OTHER PUBLICATIONS

First Office Action and Search Report dated Oct. 9, 2022, in corresponding Chinese Application No. 202011475053.0.
(Continued)

*Primary Examiner* — Agustin Bello
(74) *Attorney, Agent, or Firm* — Harness, Dickey & Pierce, P.L.C.

(57) ABSTRACT

The present disclosure discloses an optical module including: a circuit board; a housing assembly divided by a separation board into a first portion and a second portion that are stacked one above the other, wherein a light-emitting cavity is formed in the second portion, and a partition wall is provided in the first portion to separate the first portion into a light-receiving cavity and a slot, and is provided with a plurality of light-passing holes via which the light-receiving cavity is in communication with the slot; an optical fiber (Continued)

adapter disposed in the housing assembly and in communication with the light-receiving cavity; a light-emitting assembly arranged in the light emitting cavity and electrically connected to the circuit board, wherein heat generated by the light-emitting assembly is conducted to a surface of the housing assembly via the partition wall; and a light-receiving assembly.

20 Claims, 14 Drawing Sheets

(56) References Cited

U.S. PATENT DOCUMENTS

| | | | | |
|---|---|---|---|---|
| 9,866,328 | B2* | 1/2018 | Wang | G02B 6/42 |
| 10,193,590 | B1* | 1/2019 | Chen | H04B 1/40 |
| 10,712,514 | B2* | 7/2020 | Chen | G02B 6/4272 |
| 10,763,987 | B2* | 9/2020 | Chen | H04J 14/0213 |
| 10,840,640 | B1* | 11/2020 | Yu | H01R 13/635 |
| 11,181,705 | B2* | 11/2021 | Chen | G02B 6/4281 |
| 11,474,311 | B1* | 10/2022 | Lin | G02B 6/4246 |
| 11,616,575 | B2* | 3/2023 | Li | H04B 10/503 |
| | | | | 250/216 |
| 2006/0060755 | A1* | 3/2006 | Li | H04B 10/40 |
| | | | | 250/214 R |
| 2009/0211801 | A1 | 8/2009 | Edwards et al. | |
| 2015/0098127 | A1* | 4/2015 | Kurokawa | H04B 10/50 |
| | | | | 359/484.03 |
| 2016/0191166 | A1* | 6/2016 | Wang | G02B 6/42 |
| | | | | 398/135 |
| 2017/0269315 | A1* | 9/2017 | Yeh | G02B 6/4274 |
| 2019/0082200 | A1* | 3/2019 | Lavoie | H04N 5/45 |
| 2019/0187391 | A1* | 6/2019 | Fujimura | H01L 31/02161 |
| 2019/0204516 | A1* | 7/2019 | Chen | G02B 6/4246 |
| 2019/0204517 | A1* | 7/2019 | Chen | G02B 6/4284 |
| 2019/0281691 | A1* | 9/2019 | Matsui | H05K 1/0203 |
| 2020/0014484 | A1* | 1/2020 | Chen | H04B 10/2589 |
| 2020/0288589 | A1* | 9/2020 | Lavoie | H05K 7/20163 |
| 2020/0328815 | A1* | 10/2020 | Li | H04B 10/503 |
| 2021/0022267 | A1* | 1/2021 | Yu | H05K 7/20127 |
| 2022/0011528 | A1* | 1/2022 | Fujimura | G02B 6/4206 |
| 2022/0137301 | A1* | 5/2022 | Lu | G02B 6/368 |
| | | | | 385/138 |
| 2022/0326456 | A1* | 10/2022 | Zhang | G02B 6/4246 |
| 2023/0194802 | A1* | 6/2023 | Sun | H04B 10/673 |
| | | | | 385/14 |
| 2023/0228955 | A1* | 7/2023 | Zhang | G02B 6/4292 |
| | | | | 385/93 |
| 2023/0258883 | A1* | 8/2023 | Zhang | G02B 6/4284 |
| | | | | 385/15 |

FOREIGN PATENT DOCUMENTS

| | | |
|---|---|---|
| CN | 208953742 U | 6/2019 |
| CN | 110542956 A | 12/2019 |
| CN | 111367030 A | 7/2020 |
| CN | 111913258 A | 11/2020 |

OTHER PUBLICATIONS

First Office Action and Search Report dated Oct. 9, 2022, in corresponding Chinese Application No. 202011475117.7.

* cited by examiner left　　right

OPTICAL MODULE

CROSS-REFERENCE TO RELATED APPLICATION

This disclosure is a continuation application of PCT/CN2021/100998, filed Jun. 18, 2021, and claims the priority to the Chinese patent application No. 202011475117.7, filed with the China National Intellectual Property Administration on Dec. 14, 2020 and entitled "Optical Module", the Chinese patent application No. 202011475053.0, filed with the China National Intellectual Property Administration on Dec. 14, 2020 and entitled "Optical Module", and the Chinese patent application No. 202011466271.8, filed with the China National Intellectual Property Administration on Dec. 14, 2020 and entitled "Optical Module", all of which are incorporated herein by reference in their entireties.

FIELD OF THE PRESENT DISCLOSURE

The present disclosure relates to the field of optical communication technologies, and in particular, to an optical module.

BACKGROUND OF THE PRESENT DISCLOSURE

With the development of new business and applications such as cloud computing, mobile internet, and video, etc., developments and progresses for optical communication technologies have become more and more important. In optical communication technologies, an optical module is a tool for achieving mutual conversion between optical signals and electric signals, and is one of the key devices in an optical communication equipment. With the developments in the optical communication technologies, a transmission rate of the optical module continues to increase.

Usually, the number of transmission channels in the optical module may be increased for improving a transmission rate for an optical module; for example, an optical module comprising a set of light-emitting sub-modules (which emits lights with one wavelength) and a set of light-receiving sub-modules (which receives lights with one wavelength) is improved to comprise two sets of light-emitting sub-modules (each set emits lights with one wavelength) and two sets of light-receiving sub-modules (each group receives lights with one wavelength). In this way, in the optical module, the volume occupied by the light-emitting sub-modules and the light-receiving sub-modules in the optical module will continue to increase, which is in turn not beneficial for further development of the optical module.

SUMMARY OF THE PRESENT DISCLOSURE

In a first aspect, the present disclosure discloses an optical module, including: a circuit board; a housing assembly into which the circuit board is inserted, which is divided by a separation board into a first portion and a second portion that are stacked one above the other, wherein a light-emitting cavity is formed in the second portion, and a partition wall is provided in the first portion to separate the first portion into a light-receiving cavity and a slot that is arranged approximate to the circuit board, wherein the partition wall is provided with a plurality of light-passing holes via which the light-receiving cavity is in communication with the slot; an optical fiber adapter, which is arranged in the housing assembly at a side away from the circuit board, and is in communication with the light-receiving cavity; a light-emitting assembly, which is arranged in the light emitting cavity and is electrically connected to the circuit board, wherein heat generated by the light-emitting assembly is conducted to a surface of the housing assembly via the partition wall; and a light-receiving assembly, which includes a wavelength-division multiplexing component, a lens array and a light-receiving chip, wherein the wavelength-division multiplexing component is arranged in the light-receiving cavity for demultiplexing a multiplexed beam transmitted by the optical fiber adapter into multiple beams of different wavelengths and transmitting the demultiplexed multiple beams to the lens array through respective light-passing holes; wherein the lens array is arranged in the slot for converging the multiple beams transmitted through the light-passing holes onto the light-receiving chip; wherein the light-receiving chip is arranged on an end surface of the circuit board that is inserted within the housing assembly for receiving the converged beams and converting them into a current signal.

In a second aspect, the present disclosure discloses an optical module including: a circuit board; a housing assembly, which is divided by a separation board into a light-receiving portion and a light-emitting cavity that are stacked one above the other, wherein the light-receiving portion is provided with a plurality of light-passing holes, wherein the circuit board is inserted into the housing assembly; an optical fiber adapter, which is arranged in the housing assembly at a side away from the circuit board, and is in communication with the light-emitting cavity; a light-receiving assembly, which is arranged in the light-receiving portion and is electrically connected with the circuit board; and a light-emitting assembly, which is arranged in the light-emitting cavity and is electrically connected to the circuit board; wherein the light-emitting assembly includes a wavelength division multiplexing component, a lens array and a laser assembly, and the laser assembly, the lens array and the wavelength division multiplexing component are disposed in sequence along a light-emitting path, wherein the laser assembly is arranged underneath the light-passing holes for emitting multiple beams of different wavelengths; wherein the lens array is configured to convert the multiple beams into multiple collimated beams; the wavelength division multiplexing component is configured to multiplex multiple collimated beams into a multiplexed beam and to couple the multiplexed beam to the optical fiber adapter.

In a third aspect, the present disclosure discloses an optical module including: a circuit board, an upper surface of which is provided with a light-receiving chip, and a lower surface of which is provided with a pad; a housing assembly, an upper surface of which is downwardly recessed to form a light-receiving cavity and a slot, with a partition wall being provided between the light-receiving cavity and the slot, wherein the partition wall is provided with light-passing holes to communicate the light-receiving cavity with the slot; wherein a lower surface of the housing assembly is upwardly recessed to form a light-emitting cavity; a first optical fiber adapter, which is arranged at one end of the light-receiving cavity; a third optical fiber adapter, which is arranged at one end of the light-emitting cavity, with a notch being provided at the other end of the light-emitting cavity; a light-emitting assembly, which is arranged in the light-emitting cavity and is configured to transmit lights to the third optical fiber adapter; wherein one end of the circuit board protrudes into the light-emitting cavity via the notch; the pad is arranged in the light-emitting cavity and is connected with the light-emitting assembly by wires; an optical component, which is arranged in the light-receiving cavity and is configured to receive lights from the first optical fiber adapter; a reflective mirror, which is disposed at the slot and reflects lights from the optical component; and a light-receiving chip, which is arranged between the reflective mirror and the circuit board and is located outside the housing assembly, and is configured to receive lights from the reflective mirror.

DETAILED DESCRIPTION OF THE EMBODIMENTS

Hereinafter, technical solutions in some embodiments of the present disclosure will be described clearly and completely with reference to the accompanying drawings. Obviously, the described embodiments merely show some but not all embodiments of the present disclosure. All other embodiments obtained by a person of ordinary skill in the art based on the embodiments of the present disclosure shall fall within the protection scope of the present disclosure.

In the description of the specification, the terms "one embodiment", "some embodiments", "exemplary embodiment(s)", "an example", "a specific example" or "some examples" etc. are intended to indicate that specific features, structures, materials or properties related to the embodiment(s) or example(s) are comprised in at least one embodiment or example of the present disclosure. Schematic representations of the above terms do not necessarily refer to the same embodiment(s) or example(s). In addition, the specific features, structures, materials or characteristics described may be comprised in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined with "first" and "second" may explicitly or implicitly comprise one or more of the features. In the description of the embodiments of the present disclosure, "plurality" means two or more unless otherwise specified.

In describing some embodiments, the expression "connected" and its derivatives may be used. For example, the term "connected" may be used in the description of some embodiments to indicate that two or more parts are in direct physical or electrical contact with each other. However, the term "connected" may also mean that two or more parts are not in direct contact with each other, but still cooperate or interact with each other. The embodiments disclosed herein are not necessarily limited by the contents herein.

The use of the term "configured to" herein is meant to be open and inclusive, and is not meant to exclude a situation that that the device is configured to perform additional tasks or steps.

Additionally, the use of the term "based on" is meant to be open and inclusive, as a process, step, calculation or other actions "based on" one or more of the stated conditions or values may in practice be based on additional conditions or values.

Figure 1:
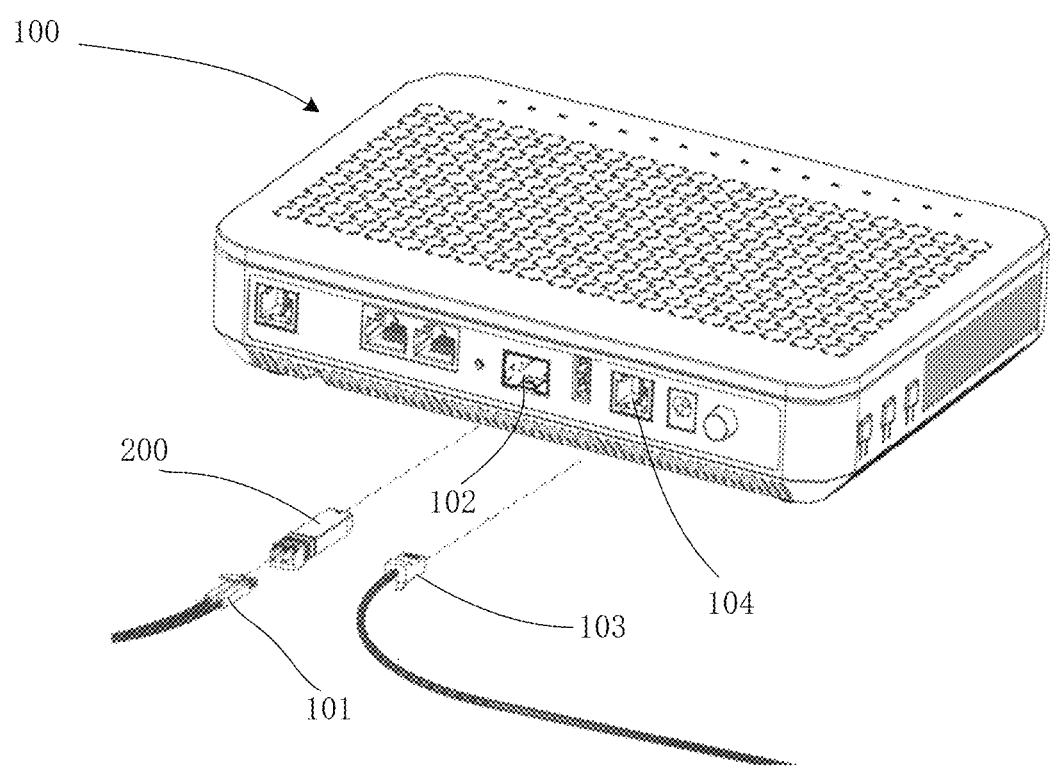
FIG. 1 is a schematic diagram of a connection relationship of optical communication terminals.

FIG. 1 is a schematic diagram of a connection relationship of optical communication terminals. As shown in FIG. 1, the connection of the optical communication terminals mainly comprises interconnections between an optical network terminal 100, an optical module 200, an optical fiber 101 and a network cable 103.

One end of the optical fiber 101 is connected to a remote server, and one end of the network cable 103 is connected to a local information processing device. The connection between the local information processing device and the remote server is realized by the connection between the optical fiber 101 and the network cable 103; while the connection between the optical fiber 101 and the network cable 103 is achieved by the optical network terminal 100 with the optical module 200.

The optical fiber 101 is connected to an optical port of the optical module 200, and a two-way optical-signal-connection is established between the optical module 200 and the optical fiber 101; an electrical port of the optical module 200 is connected to the optical network terminal 100, and a two-way electrical-signal-connection is established between the optical module 200 and the optical network terminal 100; a mutual conversion between optical signals and electrical signals takes place internally within the optical module, so as to establish an information connection between the optical fiber and the optical network terminal. In some embodiments of the present disclosure, an optical signal from an optical fiber is converted into an electrical signal by the optical module and then input into the optical network terminal 100, and an electrical signal from the optical network terminal 100 is converted into an optical signal by the optical module and input into the optical fiber.

The optical network terminal has an optical module interface 102 for receiving the optical module 200 and establishing a two-way electrical-signal-connection with the optical module 200; the optical network terminal has a network cable interface for receiving the network cable 103 and establishing a two-way electrical-signal-connection with the network cable 103; the connection between the optical module 200 and the network cable 103 is established via the optical network terminal 100. In some embodiments of the present disclosure, the optical network terminal transmits signals from the optical module to the network cable, and transmits signals from the network cable to the optical module, and the optical network terminal serves as the host computer of the optical module to monitor the operation of the optical module.

So far, the remote server has established a two-way signal transmission channel with the local information processing device through the optical fiber, the optical module, the optical network terminal and the network cable.

A common information processing device comprises routers, switches, electronic computers, etc.; the optical network terminal is the host computer of the optical module, providing data signals to the optical module and receiving data signals from the optical module. A common optical module host computer may also be an optical line terminal, etc.

Figure 2:
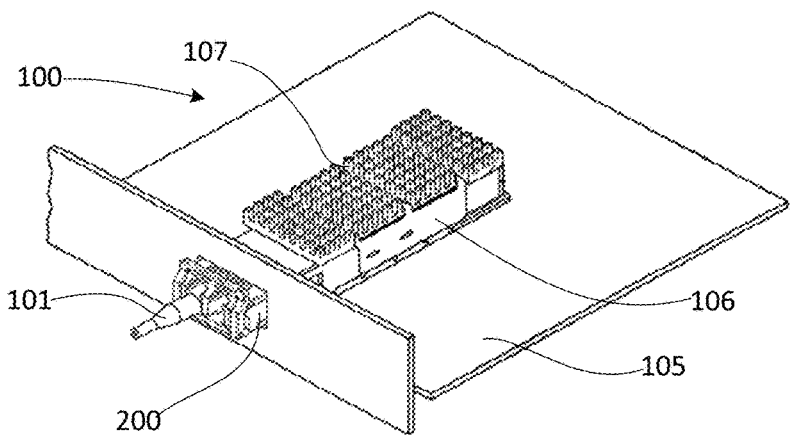
FIG. 2 is a schematic structural diagram of an optical network terminal.

FIG. 2 is a schematic structural diagram of an optical network terminal. As shown in FIG. 2, the optical network terminal 100 includes a circuit board 105, and a cage 106 is provided on the surface of the circuit board 105; an electrical connector is provided inside the cage 106 for connecting to an optical module electrical port such as a golden finger; a heat sink 107 is provided on the cage 106, and the heat sink 107 has a first protrusion such as fins for increasing heat dissipation area.

The optical module 200 is inserted into the optical network terminal 100, specifically, the electrical port of the optical module is inserted into the electrical connector inside the cage 106, and the optical port of the optical module is connected with the optical fiber 101.

The cage 106 is located on the circuit board, and the electrical connectors on the circuit board are wrapped in the cage; the optical module 200 is inserted into the cage and is fixed by the cage, and the heat generated by the optical module 200 is conducted to the cage 106 and then diffuses through the heat sink 107 on the cage.

Figure 3:
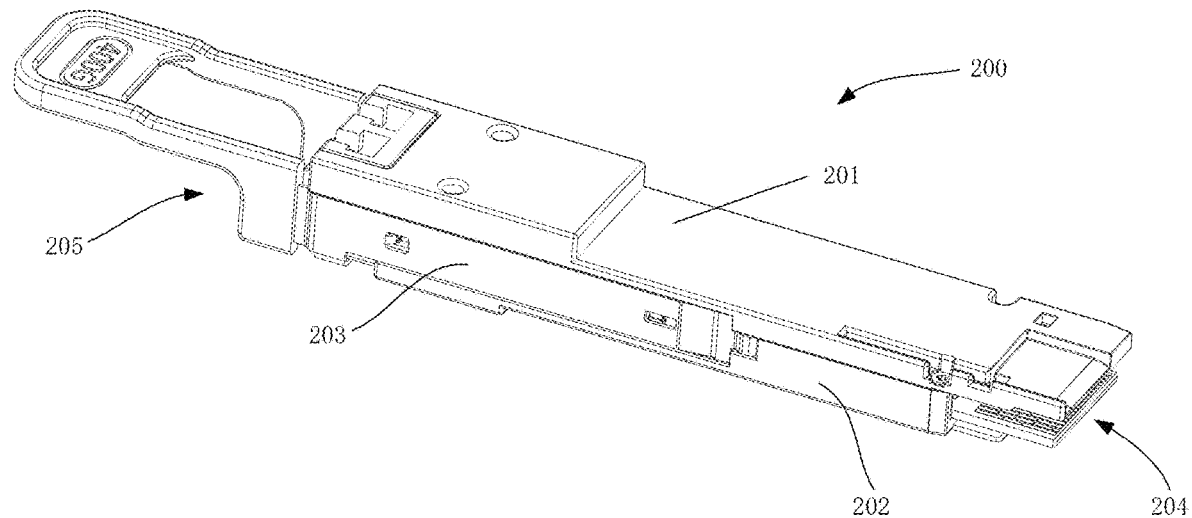
FIG. 3 is a schematic structural diagram of an optical module according to embodiments of the present disclosure.
Figure 4:
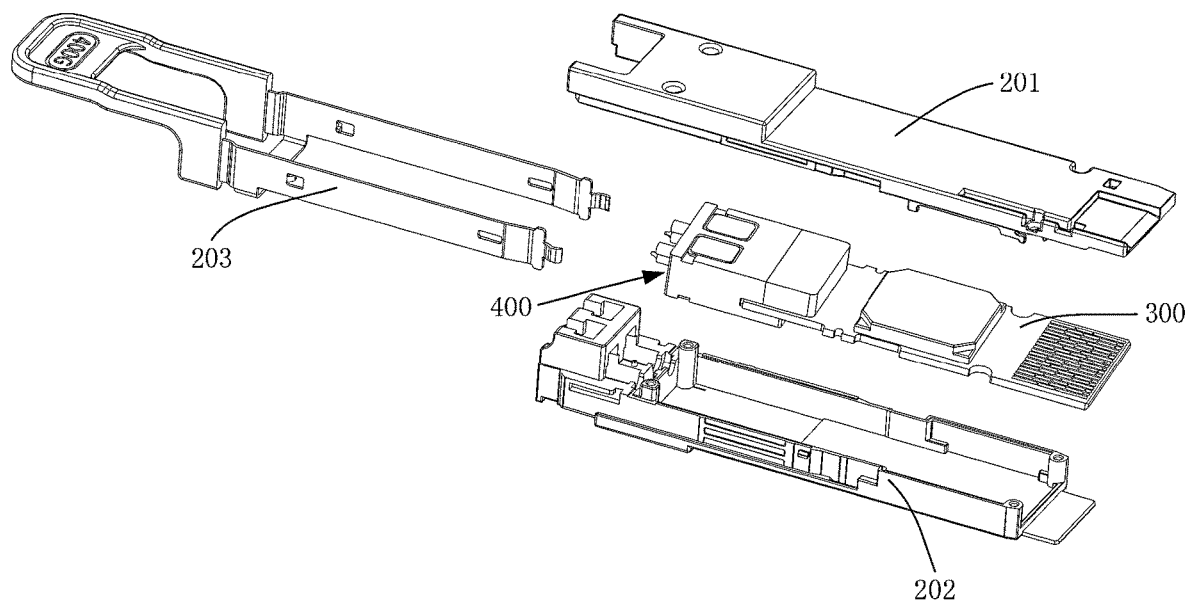
FIG. 4 is a schematic exploded diagram of an optical module according to an embodiment of the present disclosure.

FIG. 3 is a schematic structural diagram of an optical module according to an embodiment of the present disclosure, and FIG. 4 is a schematic exploded diagram of an optical module according to an embodiment of the present disclosure. As shown in FIG. 3 and FIG. 4, the optical module 200 according to the embodiment of the present disclosure comprises an upper casing 201, a lower casing 202, an unlocking part 203, a circuit board 300 and an optical sub-module 400.

The upper casing 201 is covered on the lower casing 202 to form a wrapping cavity with two openings; the outer contour of the wrapping cavity generally presents a square shape. In some embodiments of the present disclosure, the lower casing 202 comprises a main board and two side plates located on both sides of the main board and are perpendicular to the main board; the upper casing comprises a cover plate, and the cover plate covers the two side plates of the upper casing to form a wrapping cavity; the upper casing may also comprise two side walls located on both sides of the cover plate and are perpendicular to the cover plate, and the two side walls cooperates with the two side plates to realize the covering of the upper casing 201 on the lower casing 202.

One of the two openings is an electrical port 204 from which the golden fingers of the circuit board protrude and are inserted into a host computer such as an optical network terminal; the other opening is an optical port 205, which is used to receive external optical fibers to connect the optical sub-module 400 inside the optical module; the optoelectronic devices such as the circuit board 300 and the optical sub-module 400 are located in the wrapping cavity.

The assembly method of combining the upper casing and the lower casing is convenient to install the circuit board 300, the optical sub-module 400 and other devices into the casing, and the upper casing and the lower casing form the outermost packaging protection casing of the module; the upper casing and the lower casing are generally made of metal materials, which are intend to achieve electromagnetic shielding and heat dissipation, so generally, the casing of the optical module are not made into an integral part so that when assembling circuit boards and other devices, positioning parts, heat dissipation and electromagnetic shielding components can not to be installed, and this is not conducive to production automation.

The unlocking part 203 is located on the outer wall of the wrapping cavity/lower casing 202, and is used to realize the fixed connection between the optical module and the host computer, or to release the fixed connection between the optical module and the host computer.

The unlocking part 203 has a snap part matched with the cage of the host computer; the unlocking part 203 can be moved relatively on the surface of the outer wall by pulling the end of the unlocking part 203; the optical module 200 is inserted into the cage of the host computer and is fixed in the cage of the host computer by the snap part of the unlocking part 203; by pulling the unlocking part 203, the snap part of the unlocking part 203 moves with it, thereby changes the connection relationship between the snap part and the host computer to release the snapping relationship between the optical module and the host computer, so that the optical module can be pulled out from the cage of the host computer.

Circuit wirings, electronic components (such as capacitors, resistors, triodes, MOS tubes) and chips (such as MCU, laser driver chip, amplitude limiting amplifier chip, clock data recovery CDR, power management chip, data processing chip DSP), etc. are provided on the circuit board 300.

The circuit board 300 is used to provide a signal circuit for electrical connection of the signal, and the signal circuit can provide the signal. The circuit board 300 connects the electrical devices in the optical module together through circuit wirings according to the circuit design, so as to realize electrical functions such as power supply, electrical signal transmission, and grounding.

The circuit board is generally a rigid circuit board. Due to its relatively hard material, the rigid circuit board can also realize the bearing function. For example, the rigid circuit board can bear the chip securely; when the optical transceiver components are located on the circuit board, the rigid circuit board can also provide stable bearing; the rigid circuit board can also be inserted into the electrical connector in the cage of the host computer. In some embodiments of the present disclosure, metal pins/golden fingers are formed on one end surface of the rigid circuit board for connecting with the electrical connector; all these are inconvenient to implement with flexible circuit boards.

Flexible circuit boards are also used in some optical modules as a supplement to rigid circuit boards; flexible circuit boards are generally used in conjunction with rigid circuit boards. For example, flexible circuit boards can be used to connect the rigid circuit boards with optical transceiver components.

The light-emitting sub-module and the light-receiving sub-module may be collectively referred to as an optical sub-module. As shown in FIG. 4, the optical module according to an embodiment of the present disclosure comprises a light-emitting sub-module and a light-receiving sub-module, the light-emitting sub-module and the light-receiving sub-module are integrated into one optical sub-module, which means, there is integrated a light-emitting assembly and a light-receiving assembly inside the optical sub-module 400. In some embodiments of the present disclosure, the light-emitting assembly is closer to the lower casing 202 than the light-receiving assembly, but not limited thereto, the light-receiving assembly may also be closer to the lower casing 202 than the light-emitting assembly.

In some embodiments of the present disclosure, the circuit board 300 can be directly inserted into the optical sub-module 400 to be directly electrically connected with the light-emitting assembly and the light-receiving assembly inside the optical sub-module 400; the optical sub-module 400 can also be physical separated from the circuit board 300 and connected to the circuit board through flexible circuit boards.

When the light-emitting assembly is closer to the lower case 202 than the light-receiving assembly, both the light-emitting assembly and the light-receiving assembly are integrated in the inner cavity of the optical sub-module 400, and the light-emitting assembly and the light-receiving assembly are separated by a separation board, and the optical sub-module 400 is disposed in the wrapping cavity formed by the upper casing 201 and the lower casing 202.

Figure 5:
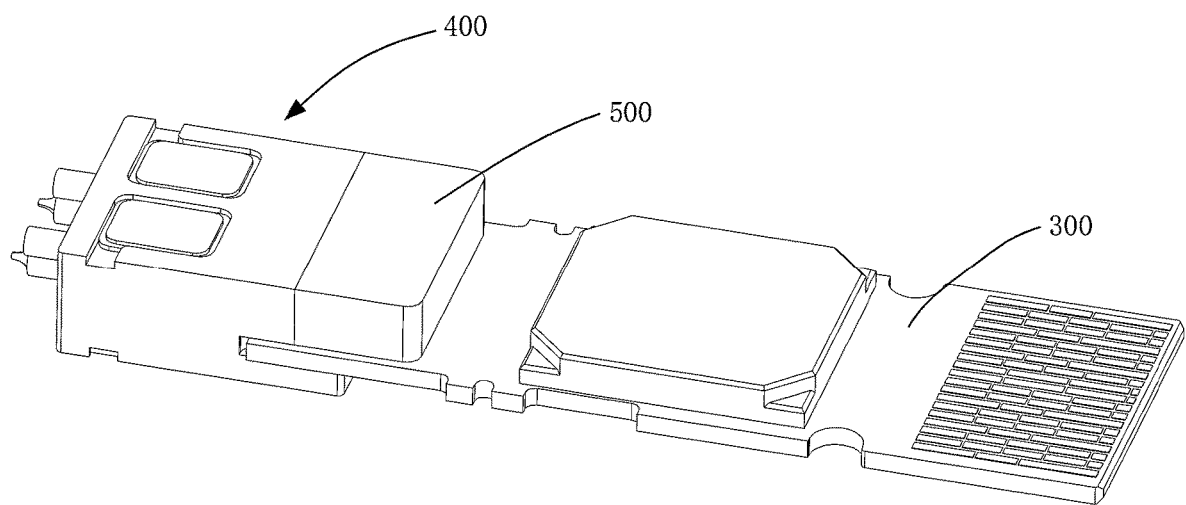
FIG. 5 is a schematic assembly diagram of a circuit board and an optical sub-module in an optical module according to an embodiment of the present disclosure.
Figure 6:
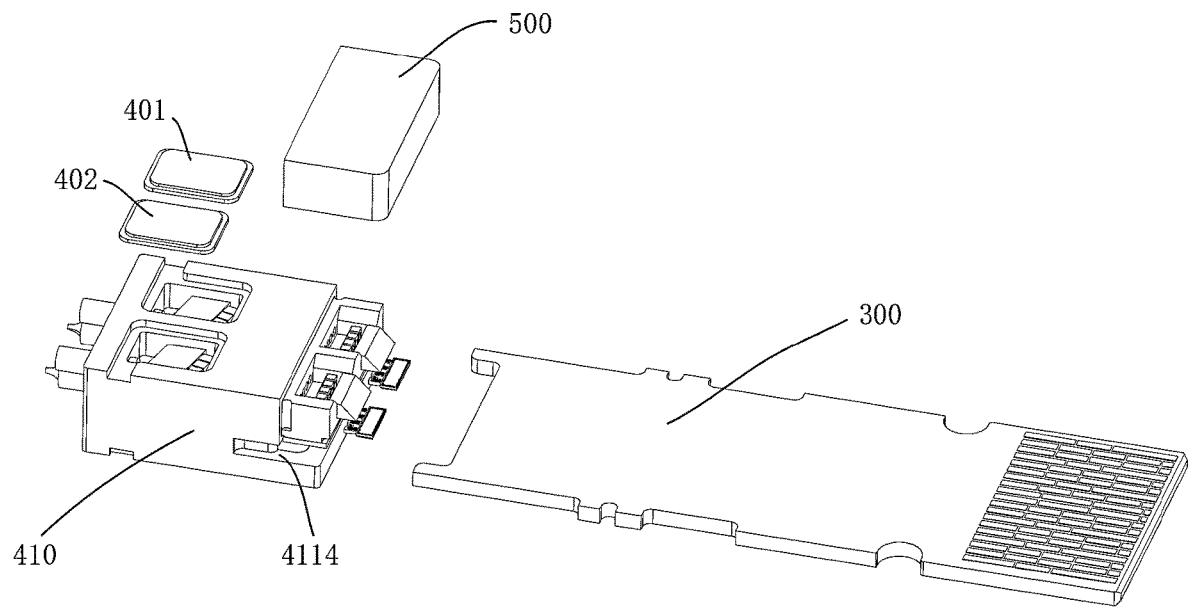
FIG. 6 is a schematic exploded diagram of a circuit board and an optical sub-module in an optical module according to an embodiment of the present disclosure.

FIG. 5 is a schematic assembly diagram of an optical sub-module 400 and a circuit board 300 in an optical module according to an embodiment of the present disclosure, and FIG. 6 is an exploded schematic view of the optical sub-module 400 and the circuit board 300 in an optical module according to an embodiment of the present disclosure. Schematic. As shown in FIG. 5 and FIG. 6, the optical sub-module 400 comprises a housing assembly 410, the upper surface of which comprises a light-receiving cavity and a slot that are downwardly recessed respectively. A partition wall is provided between the light-receiving cavity and the slot, which partition wall comprises light-passing holes to communicate the light-receiving cavity with the slot; the lower surface of the housing assembly comprises an upwardly recessed light-emitting cavity; a separation board is formed in the middle of the housing assembly.

The light-emitting assembly is located in the light-emitting cavity; the optical component is located in the light-receiving cavity. Both the light-emitting assembly and the light-receiving assembly are disposed in the inner cavity of the housing assembly 410, the light-receiving assembly and the light-emitting assembly are stacked one above the other, and the light-receiving assembly and the light-emitting assembly are separated by a separation board in the housing assembly 410, the light-receiving assembly is disposed above the separation board, and the light-emitting assembly is disposed below the separation board. One end of the circuit board 300 is inserted into the housing assembly 410, and the light-emitting assembly and the light-receiving assembly are electrically connected to the circuit board respectively, so that the light-emitting assembly realizes electro-optical conversion and emits signal light, so that the light-receiving assembly receives the signal light and realizes photoelectric conversion.

In the embodiment of the present disclosure, "above" refers to the direction of the upper housing 201 relative to the circuit board 300, and "lower" refers to the direction of the lower housing 202 relative to the circuit board 300. The inner cavity of the optical sub-module 400 is divided into a light-receiving cavity and a light-emitting cavity by a separation board, the light-receiving assembly is disposed in the light-receiving cavity, and the light-emitting assembly is disposed in the light-emitting cavity; a plurality of optical fiber adapters are provided on the left side of the optical sub-module 400, the light-emitting assembly is connected with an optical fiber adapter, and the optical fiber adapter is used to transmit the signal light emitted by the light-emitting assembly to an external optical fiber to realize the emission of signal light; the light-receiving assembly is connected with another optical fiber adapter, and the optical fiber adapter is used to transmit the signal light transmitted by the external optical fiber into the light-receiving assembly to realize the reception of the signal light.

Since the size of the overall outline of the optical module must conform to the interface size of the host computer, which is regulated by industry standards, while the optical sub-module 400 is too bulky to be arranged on the circuit board 300, one end of the circuit board 300 is inserted into the housing assembly 410 to realize the electrical connection between the optical sub-module 400 and the circuit board 300; the circuit board 300 can also be separated from the optical sub-module 400, and the transfer of the electrical connection can be realized through the flexible circuit board.

A light-receiving cavity and a light-receiving cover is provided in the upper part of the housing assembly 410, and the light-receiving cover is covered on the light-receiving cavity from above; a collimating lens, an optical multiplexing component and other devices relating to light-receiving are provided in the light-receiving cavity. An optical fiber adapter is provided on the left side of the housing assembly 410, and one end of the light-receiving cavity is connected to the optical fiber adapter, and the signal light from the outside of the optical module is received through the optical fiber adapter, and the received signal light is transmitted to light-receiving chip through optics disposed in the light-receiving cavity such as the lens and the like. A notch is provided on the side of the housing assembly 410 facing towards the circuit board 300, and the circuit board 300 is inserted into the housing assembly 410 through the notch. Electrical devices such as a light-receiving chip, a transimpedance amplifier etc. located outside the housing assembly are provided on the surface of the circuit board 300, the light beams transmitted through the optical lens such as a lens in the light-receiving cavity inject into the light-receiving chip on the circuit board 300, and the photoelectric conversion is realized by the light-receiving chip.

In the optical module according to an embodiment of the present disclosure, the light-receiving assembly in the optical sub-module 400 is used to receive signal light of various wavelengths, the signal light of different wavelengths is transmitted into the light-receiving cavity through the optical fiber adapter, and realizes beam splitting according to wavelength through the optical devices such as wavelength division multiplexing components (DeMUX) in the light-receiving cavity, the signal light after beam splitting according to wavelength is finally transmitted to the photosensitive surface of the corresponding light-receiving chip, and the light-receiving chip receives the signal light through its photosensitive surface. Typically, one light-receiving chip is used to receive signal light of one wavelength, thereby the light-receiving assembly according to an embodiment of the present disclosure comprises a plurality of light-receiving chips to form a chip array. For example, when the light-receiving assembly is used to receive signal light of four different wavelengths, the light-receiving assembly comprises four light-receiving chips for receiving the signal light of four wavelengths correspondingly; when the light-receiving assembly is used to receive the signal light of eight different wavelengths, the light-receiving assembly comprises eight light-receiving chips for receiving the signal light of the eight wavelengths correspondingly.

Figure 7:
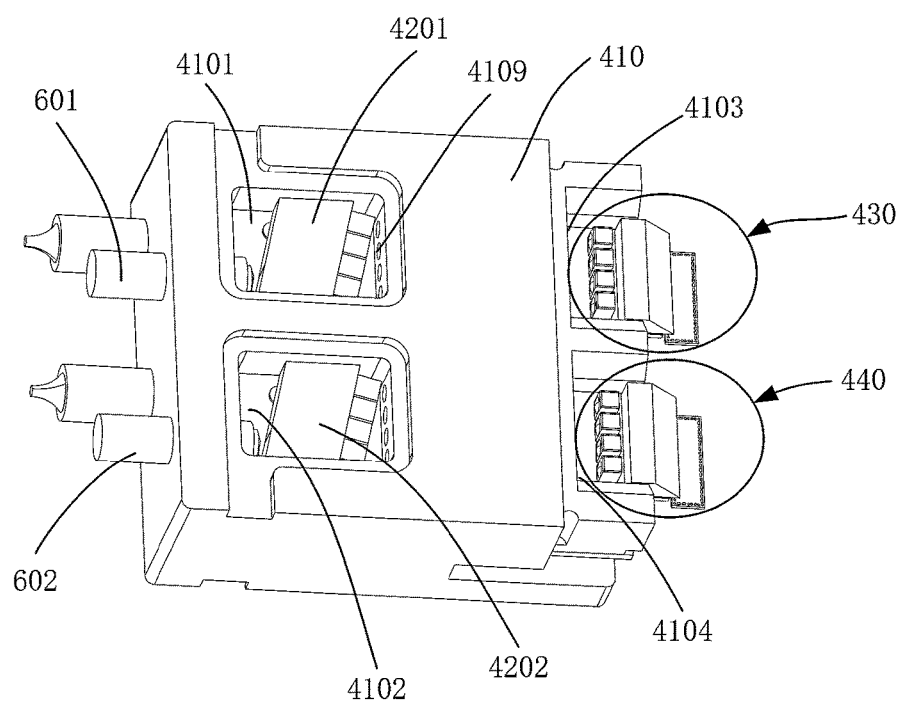
FIG. 7 is a schematic partial structure diagram of an optical sub-module in an optical module according to an embodiment of the present disclosure.

FIG. 7 is a schematic structural diagram of an optical sub-module 400 in an optical module according to an embodiment of the present disclosure. As shown in FIG. 7, two groups of light-receiving assemblies are integrated into the optical sub-module 400 according to an embodiment of the present disclosure, and a first light-receiving cavity 4101 and a second light-receiving cavity 4102 are provided in the upper part of the housing assembly 410. The first light-receiving cavity 4101 and the second light-receiving cavity 4102 are disposed side by side, that is, the first light-receiving cavity 4101 and the second light-receiving cavity 4102 are sequentially disposed along the width direction of the housing assembly 410, with the first light-receiving cavity 4101 being arranged at one side in the width direction of the housing assembly 410, and the second light-receiving cavity 4102 being arranged at the other side in the width direction of the housing assembly 410. A first collimating lens and a first wavelength division multiplexing component 4201 are provided within the first light-receiving cavity 4101, and a first optical fiber adapter 601 is provided on aside of the housing assembly 410 facing towards the optical port. The signal light transmitted by the first optical fiber adapter 601 is converted to a collimated beam via the first collimating lens, and the collimated beam is transmitted into the first wavelength division multiplexing component 4201; the collimated beam is divided into multiple signal lights of different wavelengths by the first wavelength division multiplexing component 4201. A second collimating lens and a second wavelength division multiplexing component 4202 are provided in the second light-receiving cavity 4102, and a second optical fiber adapter 602 is provided on the side of the housing assembly 410 facing towards the optical port. The signal light transmitted by the second optical fiber adapter 602 is converted into a collimated beam by the second collimating lens, and the collimated beam is transmitted into the second wavelength division multiplexing component 4202; the collimated beam is divided into multiple beams of signal light of different wavelengths by the second wavelength division multiplexing component 4202.

Figure 8:
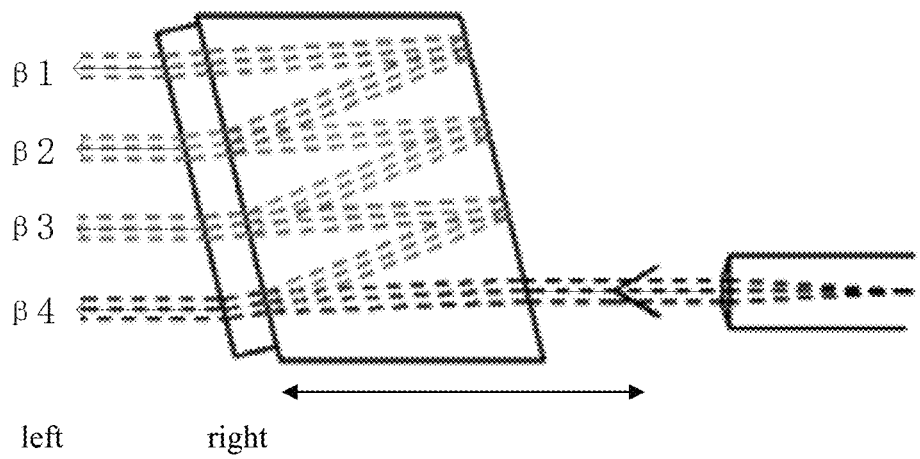
FIG. 8 is a working principle diagram of a demultiplexer (DeMUX) according to an embodiment of the present disclosure.

FIG. 8 is a working principle diagram of a DeMUX for beam splitting comprising four wavelengths ($\beta 1$, $\beta 2$, $\beta 3$, and $\beta 4$) according to an embodiment of the present disclosure. The wavelength division multiplexing component comprises a light input port for inputting signal light of multiple wavelengths on one side, and comprises a plurality of light output ports for outputting light on the other side, each light output port is used for outputting signal light of one wavelength. For example, as shown in FIG. 8, the signal light enters the DeMUX via the light input port at the right end of the DeMUX; the $\beta 1$ signal light is reflected six times at six different positions of the DeMUX before reaching its light output port; the $\beta 2$ signal light is reflected four times at four different positions of the DeMUX before reaching its light output port; the $\beta 3$ signal light is reflected twice at two different positions of the DeMUX before reaching its light output port; the $\beta 4$ signal light enters the DeMUX and is then directly transmitted to its light output port. In this way, by use of the DeMUX, signal lights of different wavelengths can enter the DeMUX through the same light input port and output through different light output ports, thereby realizing a beam splitting of a signal light of different wavelengths. In the embodiments of the present disclosure, DeMUX is not limited to using beam splitting comprising four wavelength beams, and can be selected according to actual needs.

Figure 9:
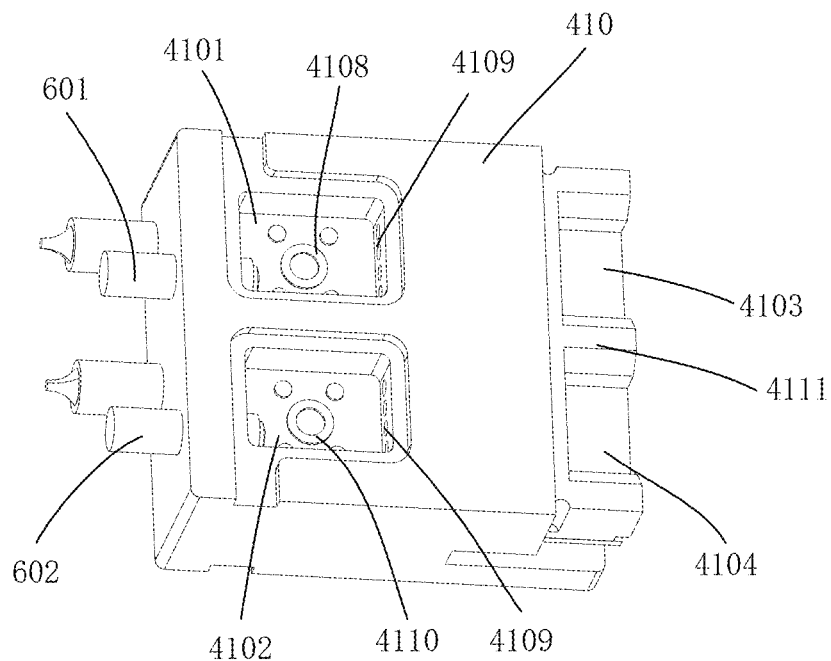
FIG. 9 is a schematic structural diagram of a housing assembly in an optical module according to an embodiment of the present disclosure.
Figure 10:
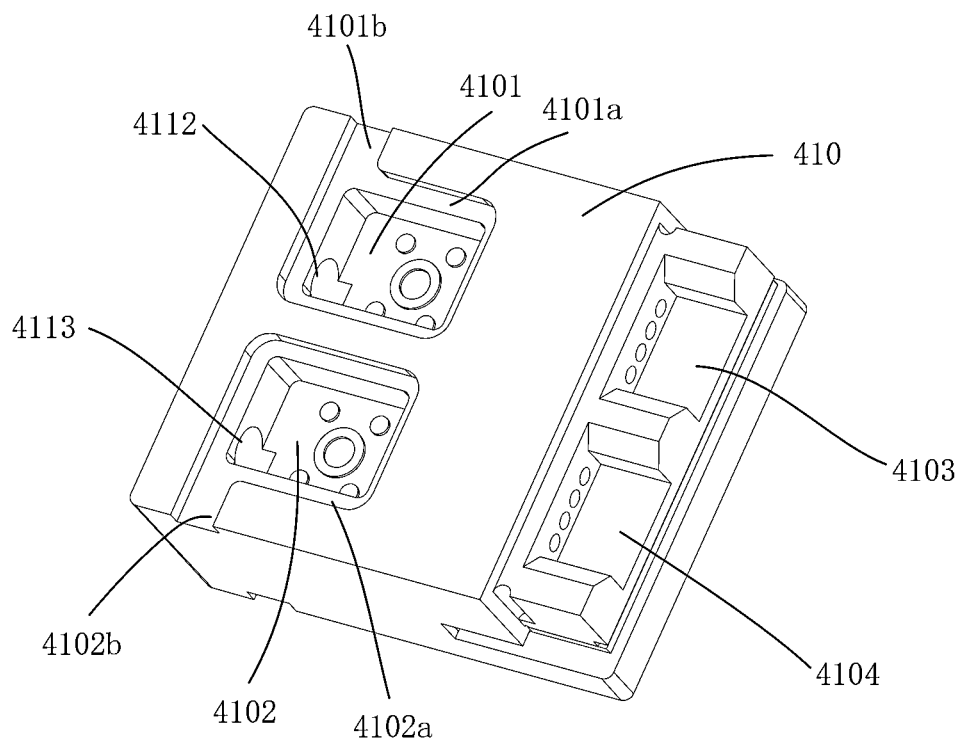
FIG. 10 is a schematic structural diagram from another angle of view for a housing assembly in an optical module according to an embodiment of the present disclosure.

FIG. 9 is a schematic structural diagram of a housing assembly 410 in an optical module according to an embodiment of the present disclosure, and FIG. 10 is schematic structural diagram from another angle of the housing assembly 410 in an optical module according to an embodiment of the present disclosure. As shown in FIG. 9 and FIG. 10, a first through hole 4112 and a second through hole 4113 are provided on the left side wall of the housing assembly 410, the first optical fiber adapter 601 is communicated with the first light-receiving cavity 4104 through the first through hole 4112, the first collimating lens is disposed between the first through hole 4112 and the first wavelength division multiplexing component 4201; the second optical fiber adapter 602 is communicated with the second light-receiving cavity 4102 through the second through hole 4113, and the second collimating lens is disposed between the second through hole 4113 and the second wavelength division multiplexing component 4202.

The first light-receiving cavity 4101 comprises a bottom plate and a side plate surrounding the bottom plate, and the bottom plate and the side plate form a cavity structure for containing the first collimating lens and the first wavelength division multiplexing component 4201. A first cover fixing glue groove 4101a is provided on the top of the side plate of the first light-receiving cavity 4101, thereby the first cover 401 can be fixedly connected to the first light-receiving cavity 4101 by glue. In some embodiments of the present disclosure, the first cover fixing glue groove 4101a forms a closed-loop structure on the top of the side plate of the first light-receiving cavity 4101, thereby the adhesive area of the first cover 401 on the top of the side plate of the first light-receiving cavity 4101 can be increased, ensuring sufficiently the packaging reliability of the first cover 401 and the top of the side plate of the first light-receiving cavity 4101. In some embodiments of the present disclosure, a first repair port 4101b is further provided on the top of the side plate of the first light-receiving cavity 4101, the first repair port 4101b is disposed on the top edge of the side plate of the first light-receiving cavity 4101, and communicates with the first cover fixing glue groove 4101a. When the inner devices in the first light-receiving cavity 4101 need to be repaired after the first cover 401 and the first light-receiving cavity 4101 were packaged, the first cover 401 can be removed from the first light-receiving cavity 4101 through the first repair port 4101b, so that the first cover 401 can be removed without damaging the first cover 401 or the first light-receiving cavity 4101, thereby reducing the difficulty and cost of repairing.

Similarly, the second light-receiving cavity 4102 comprises a bottom plate and a side plate surrounding the bottom plate, and the bottom plate and the side plate form a cavity structure for containing the second collimating lens and the second wavelength division multiplexing component 4202. A second cover fixing glue groove 4102a is provided on the top of the side plate of the second light-receiving cavity 4102, thereby the second cover 402 can be fixedly connected to the second light-receiving cavity 4102 by glue. In some embodiments of the present disclosure, the second cover fixing glue groove 4102a forms a closed-loop structure on the top of the side plate of the second light-receiving cavity 4102, thereby the adhesive area of the second cover 402 on the top of the side plate of the second light-receiving cavity 4102 can be increased, ensuring sufficiently the packaging reliability of the second cover 402 and the top of the side plate of the second light-receiving cavity 4102. In some embodiments of the present disclosure, a second repair port 4102b is further provided on the top of the side plate of the second light-receiving cavity 4102, the second repair port 4102b is disposed on the top edge of the side plate of the second light-receiving cavity 4102, and communicates with the second cover fixing glue groove 4102a. When the inner devices in the second light-receiving cavity 4102 need to be repaired after the second cover 402 and the second light-receiving cavity 4102 were packaged, the second cover 402 can be removed from the second light-receiving cavity 4102 through the second repair port 4102b, so that the second cover 402 can be removed without damaging the second cover 402 or the second light-receiving cavity 4102, thereby reducing the difficulty and cost of repairing.

In some embodiments, a first DeMUX fixing glue groove 4108 is provided on the bottom plate of the first light-receiving cavity 4101, and the first DeMUX fixing glue groove 4108 is used to hold dispensing glue. For example, when the first wavelength division multiplexing component 4201 needs to be fixed, glue is dispensed into the first DeMUX fixing glue groove 4108, and then the first wavelength division multiplexing component 4201 is installed and placed on the first DeMUX fixing glue groove 4108; after the glue is solidified, a fixing of the first wavelength division multiplexing component 4201 on the bottom plate is realized. Similarly, the second DeMUX fixing glue groove 4110 is used to hold the dispensing glue. For example, when the second wavelength division multiplexing component 4202 needs to be fixed, glue is dispensed into the second DeMUX fixing glue groove 4110, and then the second wavelength division multiplexing component 4202 is installed and placed on the second DeMUX fixing glue groove 4110; after the glue is solidified, a fixing of the second wavelength division multiplexing component 4202 on the bottom plate is realized.

The DeMUX fixing glue groove formed on the bottom surface of the light-receiving cavity has an annular, protuberant circumference. The circumference is of a closed shape, so that the glue groove is delimited by the closed circumference. The wavelength division multiplexing component is disposed onto the annular, protruded circumference. Glue is provided into the groove enclosed by the annular, protuberant circumference for adhering the wavelength division multiplexing component.

In the embodiments of the present disclosure, a first slot 4103 and a second slot 4104 are provided on the side of the housing assembly 410 facing towards the circuit board 300, and the first slot 4103 and the second slot 4104 are sequentially disposed along the width direction of the housing assembly 410, wherein both the upper side and right side of the first slot 4103 and the second slot 4104 are open, with the first slot 4103 and the second slot 4104 being separated by the separation board 4111. A first light-receiving assembly 430 is provided inside of the first slot 4103, and a second light-receiving assembly 440 is provided inside the second slot 4104. Taking the receiving of light of eight wavelengths comprising two wavelength bands as an example, a single wavelength band comprises light of four wavelengths, wherein, the signal light transmitted by the first optical fiber adapter 601 is converted into a collimated beam through the first collimating lens, and the collimated beam then demultiplexes a collimated beam into four beams of different wavelengths via the first wavelength division multiplexing component 4201, the four beams of different wavelengths are respectively transmitted to the first light-receiving assembly 430, and the first light-receiving assembly 430 realizes the photoelectric conversion; the signal light transmitted by the second optical fiber adapter 402 is converted into a collimated beam through the second collimating lens, and the collimated beam then demultiplexes a collimated beam into four beams of different wavelengths via the second wavelength division multiplexing component 4202, the four beams of different wavelengths are respectively transmitted to the second light-receiving assembly 440, and photoelectric conversion is realized by the second light-receiving assembly 440.

Figure 11:
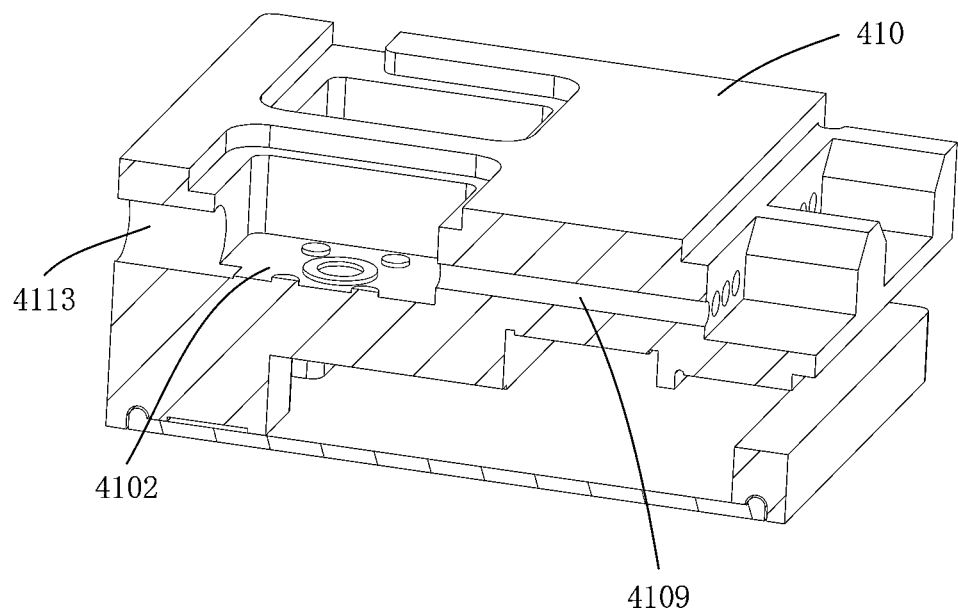
FIG. 11 is a partial cross-sectional view of a housing assembly in an optical module according to an embodiment of the present disclosure.

FIG. 11 is a partial cross-sectional view of a housing assembly 410 in an optical module according to an embodiment of the present disclosure. As shown in FIG. 11, the first light-receiving cavity 4101 and the first slot 4103 may be communicated through light-passing holes 4109; that is, the first light-receiving cavity 4101 and the first slot 4103 are separated by a partition wall, with a plurality of light-passing holes 4109 being provided in the partition wall; the multiple beams of different wavelengths demultiplexed and output through the first wavelength division multiplexing component 4201 in the first light-receiving cavity 4101 are transmitted to the first light-receiving assembly 430 via the corresponding light-passing holes 4109. Similarly, the second light-receiving cavity 4102 and the second slot 4104 may be communicated through the light-passing holes, that is, the second light-receiving cavity 4102 and the second slot 4104 are separated by the partition wall provided with the light-passing holes 4109; the multiple beams of different wavelengths demultiplexed and output through the second wavelength division multiplexing component 42012 in the second light-receiving cavity 4102 are transmitted to the second light-receiving assembly 440 via the corresponding light-passing holes 4109.

In the embodiments of the present disclosure, the first wavelength division multiplexing component 4201 is used to demultiplex one beam into four beams of different wavelengths. Therefore, four light-passing holes 4109 are provided between the first light-receiving cavity 4101 and the first slot 4103, the four light-passing holes 4109 are sequentially disposed along the width direction of the housing assembly 410, and the four light output ports of the first wavelength division multiplexing component 4201 are disposed in one-to-one correspondence with the four light-passing holes 4109, so that the four beams of different wavelengths demultiplexed and output from the first wavelength division multiplexing component 4201 are respectively transmitted to the first light-receiving assembly 430 through the corresponding light-passing holes 4109. Similarly, the second wavelength division multiplexing component 4202 is used to demultiplex one beam into four beams of different wavelengths. Therefore, four light-passing holes 4109 are provided between the second light-receiving cavity 4102 and the second slot 4104, the four light-passing holes 4109 are sequentially disposed along the width direction of the housing assembly 410, and the four light output ports of the second wavelength division multiplexing component 4202 are disposed in one-to-one correspondence with the four light-passing holes 4109, so that the four beams of different wavelengths demultiplexed and output from the second wavelength division multiplexing component 4202 are respectively transmitted to the second light-receiving assembly 440 through the corresponding light-passing holes 4109.

In the embodiments of the present disclosure, the first light-receiving cavity 4101 and the first slot 4103 can also be directly communicated into an integrated cavity, and a first collimating lens and the first wavelength division multiplexing component 4201 are provided on the side of the integrated cavity close to the first optical fiber adapter 601, the first light-receiving assembly 430 is disposed on the side of the integrated cavity close to the circuit board 300, so that the signal light transmitted by the first optical fiber adapter 601 is converted to collimated beam through the first collimating lens, the collimated beam is demultiplexed into four beams with different wavelengths via the first wavelength division multiplexing component 4201, and the four beams of different wavelengths are directly transmitted to the first light-receiving assembly 430. Similarly, the second light-receiving cavity 4102 and the second slot 4104 can also be directly communicated into an integrated cavity, and a second collimating lens and the second wavelength division multiplexing component 4202 are provided on the side of the integrated cavity close to the second optical fiber adapter 602, the second light-receiving assembly 440 is disposed on the side of the integrated cavity close to the circuit board 300, so that the signal light transmitted by the second optical fiber adapter 602 is converted to collimated beam through the second collimating lens, the collimated beam is demultiplexed into four beams with different wavelengths via the second wavelength division multiplexing component 4202, and the four beams of different wavelengths are directly transmitted to the second light-receiving assembly 440.

Compared with communicating the first light-receiving cavity 4101 and the first slot 4103 into an integrated cavity, the way of the first light-receiving cavity 4101 communicating with the first slot 4103 through the light-passing hole 4109 can reduce the processing of the housing assembly 410, and the structure of the housing assembly 410 is more retained, so that the heat generated by the optoelectronic devices of the light-receiving assembly and the optoelectronic devices of the light-emitting assembly is conducted to the upper housing 201 and the lower housing 202 through where has no drilling on the housing assembly 410, therefore increasing the heat dissipation efficiency of the optical sub-module 400.

Figure 12:
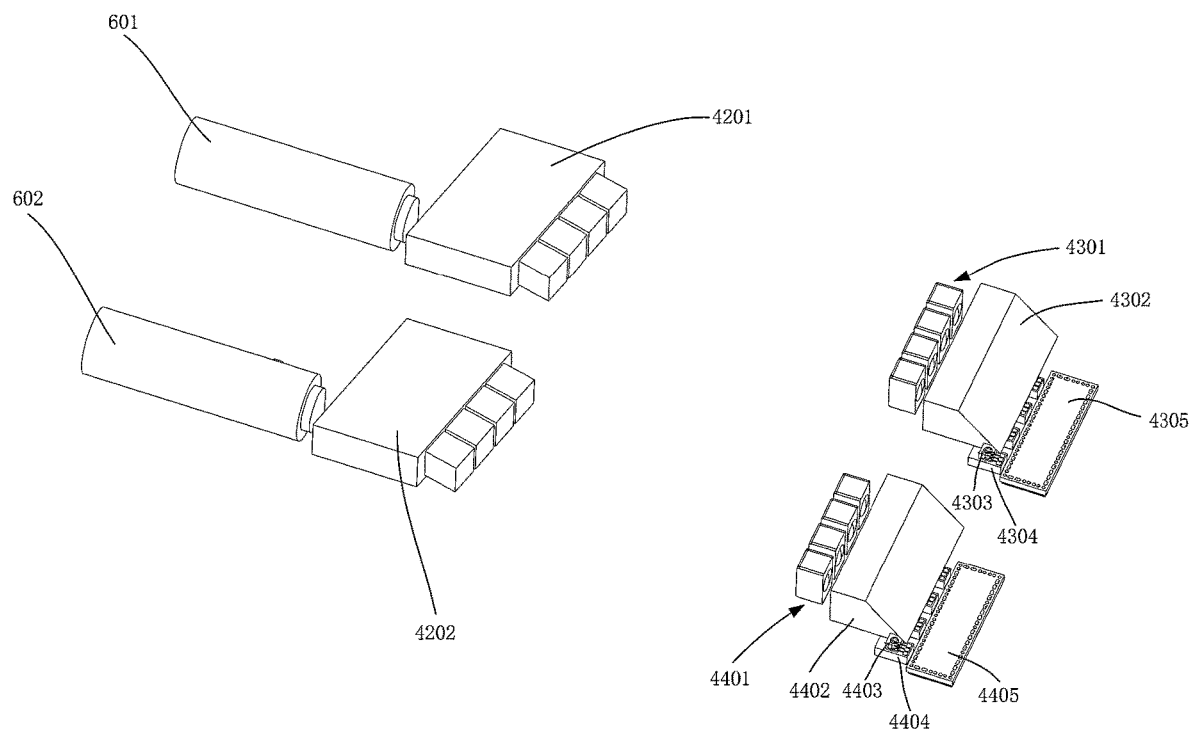
FIG. 12 is a schematic structural diagram of a light-receiving assembly in an optical module according to an embodiment of the present disclosure.
Figure 13:
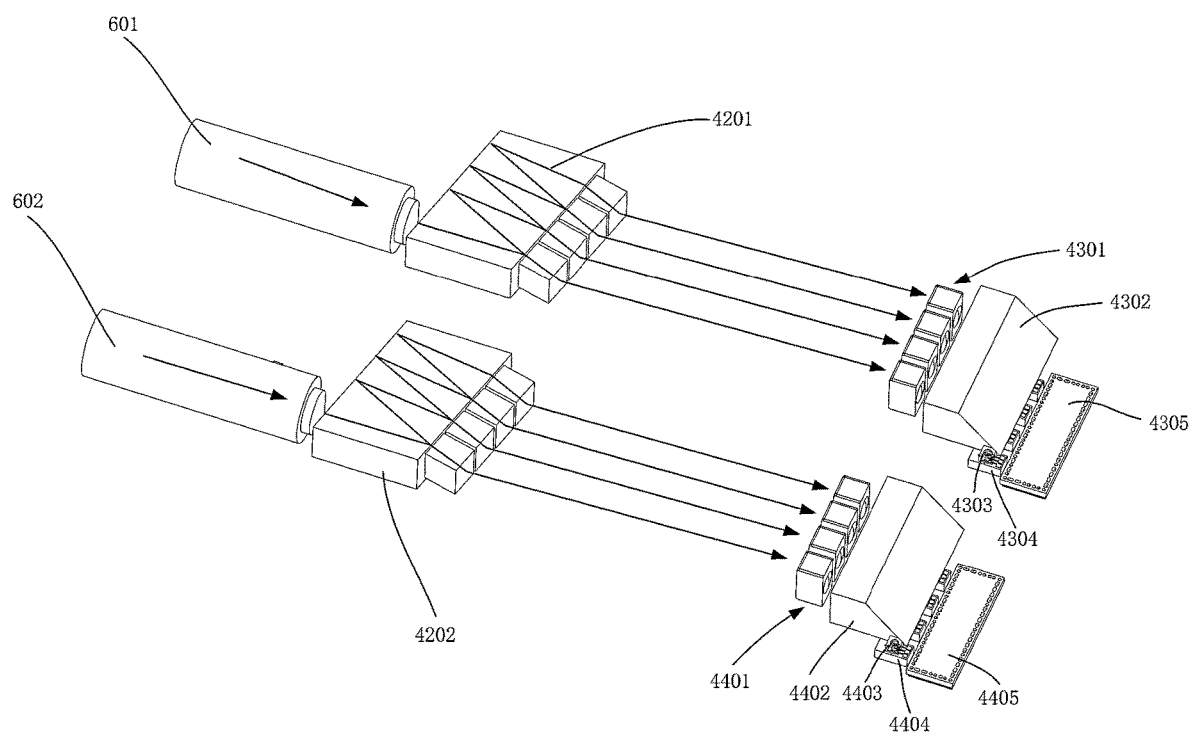
FIG. 13 is a schematic diagram of an optical path of a light-receiving assembly in an optical module according to an embodiment of the present disclosure.

FIG. 12 is a schematic structural diagram of a light-receiving assembly in an optical sub-module 400 in an optical module according to an embodiment of the present disclosure, and FIG. 13 is a schematic diagram of an optical path of a light-receiving assembly in the optical sub-module 400 in an optical module according to an embodiment of the present disclosure Schematic. As shown in FIG. 12 and FIG. 13, the first light-receiving assembly 430 and the second light-receiving assembly 440 respectively comprise several light-receiving chips, which are PDs (photodetectors), such as APDs (avalanche diodes), for converting the received signal light into photocurrent. In some embodiments of the present disclosure, the light-receiving chips in the first light-receiving assembly 430 and the second light-receiving assembly 440 are respectively disposed on the surface of the metallized ceramic which forms a circuit pattern that can supply power to the light-receiving chip. Then, the metallized ceramic provided with the light-receiving chip is applied on the circuit board 300, or the light-receiving chip is applied on the flexible circuit board which is electrically connected with the circuit board 300.

In the embodiments of the present disclosure, the first light-receiving assembly 430 and the second light-receiving assembly 440 further comprise transimpedance amplifiers, respectively, the transimpedance amplifiers are directly applied on the circuit board 300, are connected to the corresponding light-receiving chips, and receive the current signal generated by the light-receiving chip and convert the received current signal into a voltage signal. In some embodiments of the present disclosure, the transimpedance amplifiers are connected to the corresponding light-receiving chip by means of wire adhering, such as a semiconductor gold wire adhering (Gold Wire Bonding).

In some embodiments of the present disclosure, the first light-receiving assembly 430 comprises a first ceramic substrate 4304 and a first transimpedance amplifier 4305. The first transimpedance amplifier 4305 is placed on one side of the first ceramic substrate 4304, as shown in FIG. 13, the first transimpedance amplifier 4305 is located on the right side of the first ceramic substrate 4304. Wherein, four first light-receiving chips 4303 are provided on the first ceramic substrate 4304, and the first ceramic substrate 4304 is connected to the first transimpedance amplifier 4305 by wire adhering, so as to achieve the connection of the first light-receiving chip 4303 and the first transimpedance amplifier 4305. The longer the length of the wire adhering is, the larger the inductance generated by the wire adhering will be, and the signal mismatch will also be larger, while the signal output from the first light-receiving chip 4303 is a small signal, which will in turn cause the signal quality to deteriorate. Therefore, the first light-receiving chip 4303 and the first transimpedance amplifier 4305 are disposed as close as possible to reduce the length of the wire adhering and ensure the signal transmission quality, and then the first transimpedance amplifier 4305 is disposed on one side of the first ceramic substrate 4304 to cause the first ceramic substrate 4304 be disposed as close to the transimpedance amplifier 4305 as possible.

In the embodiments of the present disclosure, the first ceramic substrate 4304 is also used to elevate the first light-receiving chip 4303, so that the electrodes of the first light-receiving chip 4303 and the pins on the first transimpedance amplifier 4305 are on the same plane, ensuring that the wire adhering between the first light-receiving chip 4303 and the first transimpedance amplifier 4305 is the shortest.

Similarly, the second light-receiving assembly 440 comprises a second ceramic substrate 4404 and a second transimpedance amplifier 4405. The second transimpedance amplifier 4305 is placed on one side of the second ceramic substrate 4404, that is, the second transimpedance amplifier 4405 is located on the right side of the second ceramic substrate 4404. Wherein, four second light-receiving chips 4403 are provided on the second ceramic substrate 4404, and the second ceramic substrate 4404 is connected to the second transimpedance amplifier 4405 by wire adhering, so as to achieve the connection of the second light-receiving chip 4403 and the second transimpedance amplifier 4405. The longer the length of the wire adhering is, the larger the inductance generated by the wire adhering will be, and the signal mismatch will also be larger, while the signal output from the second light-receiving chip 4403 is a small signal, which will in turn causes the signal quality to deteriorate. Therefore, the second light-receiving chip 4403 and the second transimpedance amplifier 4405 are disposed as close as possible to reduce the length of the wire adhering and ensure the signal transmission quality, and then the second transimpedance amplifier 4405 is disposed on one side of the second ceramic substrate 4404 to cause the second ceramic substrate 4404 be disposed as close to the transimpedance amplifier 4405 as possible.

In the embodiments of the present disclosure, the second ceramic substrate 4404 is also used to elevate the second light-receiving chip 4403, so that the electrodes of the second light-receiving chip 4403 and the pins on the second transimpedance amplifier 4405 are on the same plane, ensuring that the adhering wire between the second light-receiving chip 4403 and the second transimpedance amplifier 4405 is the shortest.

In the embodiments of the present disclosure, if the pins of the transimpedance amplifier are sufficient, the first transimpedance amplifier 4305 and the second transimpedance amplifier 4405 can use one transimpedance amplifier chip, and furthermore, four first light-receiving chips 4303 and four second light-receiving chip 4403 may be disposed on one ceramic substrate.

In order to facilitate the light-receiving chip to receive the signal light, the first light-receiving assembly 430 further comprises a first lens assembly 4301, and the first lens assembly 4301 is used to adjust the optical path in the process of transmitting the four beams of different wavelengths output from the first wavelength division multiplexing component 4201 to the first light-receiving assembly 430; the second light-receiving assembly 440 further comprises a second lens assembly 4401, and the second lens assembly 4401 is used to adjust the optical path in the process of transmitting the four beams of different wavelengths output from the second wavelength division multiplexing component 4202 to the second light-receiving assembly 440.

In the embodiments of the present disclosure, the optical axis of the first lens assembly 4301 is parallel to the bottom surface of the first slot 4103, while the photosensitive surface of the first light-receiving chip 4301 is also parallel to the bottom surface of the first slot 4103, but the first light receiving chip 4301 is disposed on the upper surface of the circuit board 300, and there is a latitude difference between the bottom surface of the first slot 4103 and the upper surface of the circuit board 300. Therefore, in order to ensure that the first light-receiving chip 4301 receives the signal light normally, the first light-receiving assembly 430 further comprises a first reflective mirror 4302, the first reflective mirror 4302 is disposed above the first ceramic substrate 4304 and covers the four first light-receiving chips 4303 disposed on the first ceramic substrate 4304, changing the direction of the optical axis of the signal light emitted by the first lens assembly 4301 by means of the reflective surface of the first reflective mirror 4302, so that the optical axis of the signal light emitted by the first lens assembly 4301 is converted from a bottom surface parallel to the first slot 4103 to a bottom surface perpendicular to the first slot 4103, so that the signal light is vertically incident onto the photosensitive surface corresponding to the first light-receiving chip 4303.

The signal light transmitted to the first light-receiving cavity 4101 via the first optical fiber adapter 601 is converted into a collimated beam after passing through the first collimating lens, and the collimated beam is incident into the first wavelength division multiplexing component 4201, a collimated beam is demultiplexed into four beams of different wavelengths via the second wave demultiplexing component 4201, and the four beams of different wavelengths are transmitted to the first slot 4103 through the corresponding light holes 4109, respectively, are focused via the corresponding lenses, and then transmitted to the first reflective mirror 4302. When the four beams of different wavelengths are transmitted to the reflective surface of the first reflective mirror 4302, they are reflected by the reflective surface of the first reflective mirror 4302, so that the transmission direction of the light beam is changed from the direction parallel to the bottom surface of the first slot 4103 to the direction perpendicular to the bottom surface of the first slot 4302, and the four beams are respectively transmitted to the corresponding first light-receiving chip 4303 on the first ceramic substrate 4304 below the reflective surface of the first reflective mirror 4302 after the direction changing, photoelectric conversion is realized by the first light-receiving chip 4303.

Similarly, the optical axis of the second lens assembly 4401 is parallel to the bottom surface of the second slot 4104, while the photosensitive surface of the second light-receiving chip 4401 is also parallel to the bottom surface of the second slot 4104, but the second light receiving chip 4401 is disposed on the upper surface of the circuit board 300, and there is a height difference between the bottom surface of the second slot 4104 and the upper surface of the circuit board 300. Therefore, in order to ensure that the second light-receiving chip 4401 receives the signal light normally, the second light-receiving assembly 440 comprises a second reflective mirror 4402, the second reflective mirror 4402 is disposed above the second ceramic substrate 4404 and covers the four second light-receiving chips 44303 disposed on the second ceramic substrate 4404, changing the direction of the optical axis of the signal light emitted by the second lens assembly 4401 by means of the reflective surface of the second reflective mirror 4402, so that the optical axis of the signal light emitted by the second lens assembly 4401 is converted from a bottom surface parallel to the second slot 4104 to a bottom surface perpendicular to the second slot 4104, so that the signal light is vertically incident onto the photosensitive surface corresponding to the second light-receiving chip 4403

Figure 14:
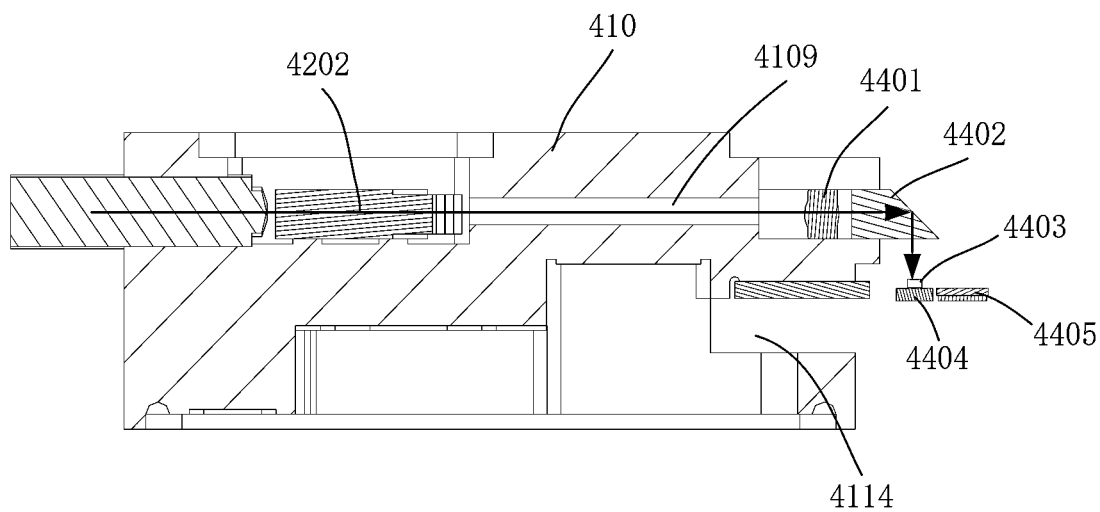
FIG. 14 is a cross-sectional view of a light-receiving assembly arranged in a housing assembly of an optical module according to an embodiment of the present disclosure.
Figure 15:
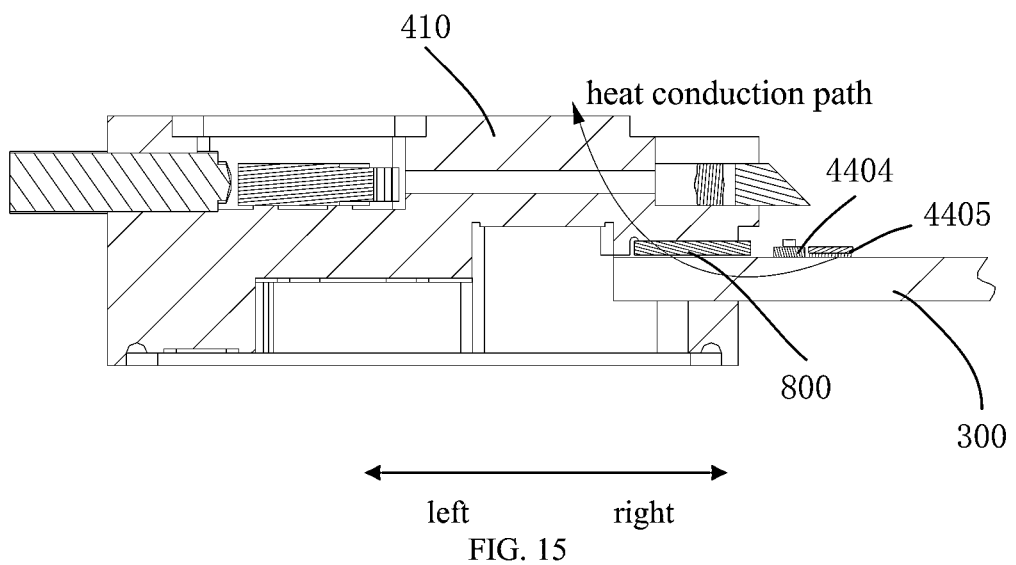
FIG. 15 is a cross-sectional view of a light-receiving assembly assembled with a circuit board in an optical module according to an embodiment of the present disclosure.

FIG. 14 is a cross-sectional view of the second light-receiving assembly 440 in the housing assembly 410 in an optical module according to an embodiment of the present disclosure, and FIG. 15 is an assembly cross-sectional view of a second light-receiving assembly 440, a housing assembly 410 and a circuit board 300 in an optical module according to an embodiment of the present disclosure. As shown in FIG. 14 and FIG. 15, the signal light transmitted to the second light-receiving cavity 4102 via the second optical fiber adapter 602 is converted into a collimated beam after passing through the first collimating lens, and the collimated beam is incident into the second wavelength division multiplexing component 4202, a collimated beam is demultiplexed into four beams of different wavelengths via the second wave demultiplexing component 4202, and the four beams of different wavelengths are transmitted to the corresponding lenses of the second lens assembly 4401 in the second slot 4104 through the corresponding light holes 4109, respectively, are focused via the corresponding lenses, and then transmitted to the second reflective mirror 4402. When the four beams of different wavelengths are transmitted to the reflective surface of the second reflective mirror 4402, they are reflected by the reflective surface of the second reflective mirror 4402, so that the transmission direction of the light beam is changed from the direction parallel to the bottom surface of the second slot 4104 to the direction perpendicular to the bottom surface of the second slot 4402, and the four beams are respectively transmitted to the corresponding second light-receiving chip 4402 on the second ceramic substrate 4404 below the reflective surface of the second reflective mirror 4403 after the direction changing, photoelectric conversion is realized by the second light-receiving chip 4403.

In the embodiments of the present disclosure, the first reflective mirror 4302 and the second reflective mirror 4402 are both 45° reflective mirrors, that is, the first reflective mirror 4302 and the second reflective mirror 4402 respectively comprise a 45° reflection surface, with the 45° reflective surface of the first reflective mirror 4302 capping the four first light-receiving chips 4303 provided on the first ceramic substrate 4304, and the 45° reflective surface of the second mirror 4402 capping the four second light-receiving chips 4403 provided on the second ceramic substrate 4404.

Since the first slot 4103 and the second slot 4104 are slots opened upwardly, in order to protect the first lens assembly 4301 and the first reflective mirror 4302 in the first slot 4103 as well as the second lens assembly 4401 and the second reflective mirror 4403 in the second slot 4104, the first slot 4103 and the second slot 4104 are covered with a covering hood 500, wherein the left side and the lower side of the covering hood 500 are both open, the left side of the covering hood 500 is connected with the partition wall of the housing, and the opening at the lower side of the covering hood 500 is in contact with an upper surface of the circuit board.

After the first lens assembly 4301 and the first reflective mirror 4302 is installed in the first slot 4103 according to the optical path of the first light-receiving assembly 430, and the second lens assembly 4401 and the second reflective mirror 4402 is installed in the second slot 4104 according to the light path of the second light-receiving assembly 440, the covering hood 500 is covered onto the first slot 4103, the second slot 4104 and the light-receiving chips; the lower opening of the covering hood 500 is in contact with the upper surface of the circuit board 300. The upper surface and two side surfaces in the width direction of the covering hood 500 are respectively in the same planes as the upper surface, two side surfaces in the width direction of the housing assembly 410, so that the first slot 4103 and the second slot 4104 cooperate with the covering hood 500 to form cavities for placing the first light-receiving assembly 430 and the second light-receiving assembly 440.

A first notch 4114 is provided at the side of the housing assembly 410 approximate to the circuit board 300; the first notch 4114 is located underneath the first slot 4103 and the second slot 4104, and the bottom surface of the first notch 4114 is parallel to the bottom surfaces of the first slot 4103 and the second slot 4104, so that when one end of the circuit board 300 is inserted into the first notch 4114, the surfaces of the circuit board 300 are parallel to the bottom surfaces of the first slot 4103 and the second slot 4104, and the first ceramic substrate 4304, the first transimpedance amplifier 4305, the second ceramic substrate 4404 and the second transimpedance amplifier 4405 provided on the circuit board 300 are also parallel to the bottom surfaces of the first slot 4103 and the second slot 4104; by this, the beam focused by the first lens assembly 4301 may be reflected by the first reflective mirror 4302 to the corresponding first light-receiving chip 4303 on the first ceramic substrate 4304, and the beam focused by the second lens assembly 4401 may be reflected by the second reflective mirror 4402 to the corresponding second light-receiving chip 4403 on the second ceramic substrate 4404.

A second notch is provided between the first notch 4114 and the bottom surfaces of the first slot 4103 and the second slot 4104, the lower side of the second notch being in communication with the first notch 4114, and the right side of the second notch is opened; an aluminum nitride ceramic substrate 800 is provided in the second notch, with the aluminum nitride ceramic substrate 800 being in contact with the inner walls of the second notch and the upper surface of the circuit board 300, respectively. In some embodiments of the present disclosure, an upper surface of the aluminum nitride ceramic substrate 800 is in contact with an upper sidewall of the second notch, while a lower surface of the aluminum nitride ceramic substrate 800 is in contact with the upper surface of the circuit board 300, and gaps between the aluminum nitride ceramic substrate 800 and housing assembly 410 as well as gaps between the aluminum nitride ceramic substrate 800 and the circuit board 300 are filled with insulating high thermal conductivity glue. As shown in the heat conduction path, the heat generated by the first light-receiving chip 4303 is conducted to the circuit board 300 through the first ceramic substrate 4304, the heat generated by the first transimpedance amplifier 4305 is directly conducted to the circuit board 300; the heat generated by the second light-receiving chip 4403 is conducted to the circuit board 300 through the second ceramic substrate 4404, the heat generated by the second transimpedance amplifier 4405 is directly conducted to the circuit board 300; meanwhile, the heat conducted to the circuit board 300 is conducted to housing assembly 410 through the copper cladding on the circuit board 300 and the aluminum nitride ceramic substrate 800, and then conducted to the upper casing 201 and the lower casing 202 of the optical module through the housing assembly 410 for heat dissipation, which improves heat dissipation efficiency of the light-receiving assembly integrated in the optical sub-module 400.

The first transimpedance amplifier 4305 and the second transimpedance amplifier 4405 are provided on the circuit board 300; the first transimpedance amplifier 4305 may also be arranged on a heat sink, and then the heat sink is provided on the upper surface of the circuit board 300, so that the heat sink can not only conduct the heat generated by the first transimpedance amplifier 4305 to the circuit board 300, but also elevate the first transimpedance amplifier 4305, so that the first transimpedance amplifier 4305 and the first light-receiving chip 4303 may be located on the same plane/in the same level. Similarly, the second transimpedance amplifier 4405 can also be arranged on a heat sink, and then the heat sink can be provided on the upper surface of the circuit board 300, so that the heat sink can not only conduct the heat generated by the second transimpedance amplifier 4405 to the circuit board 300, but also elevate the second transimpedance amplifier 4405, so that the second transimpedance amplifier 4405 and the second light-receiving chip 4403 may be located on the same plane/in the same level.

In the embodiments of the present disclosure, the optical sub-module 400 includes both a light-receiving assembly and a light-emitting assembly, with the light-receiving assembly and the light-emitting assembly being separated by a separation board; the light-receiving assembly is integrated above the separation board, and the light-emitting assembly is integrated below the separation board.

Figure 16:
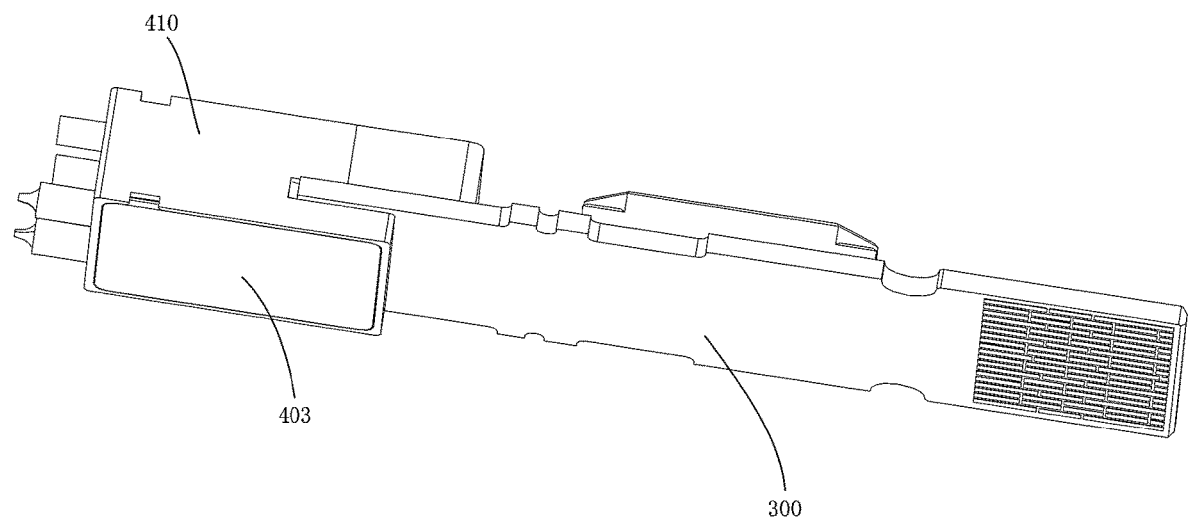
FIG. 16 is a schematic diagram from another angle of view for an optical sub-module assembled with a circuit board in an optical module according to an embodiment of the present disclosure.
Figure 17:
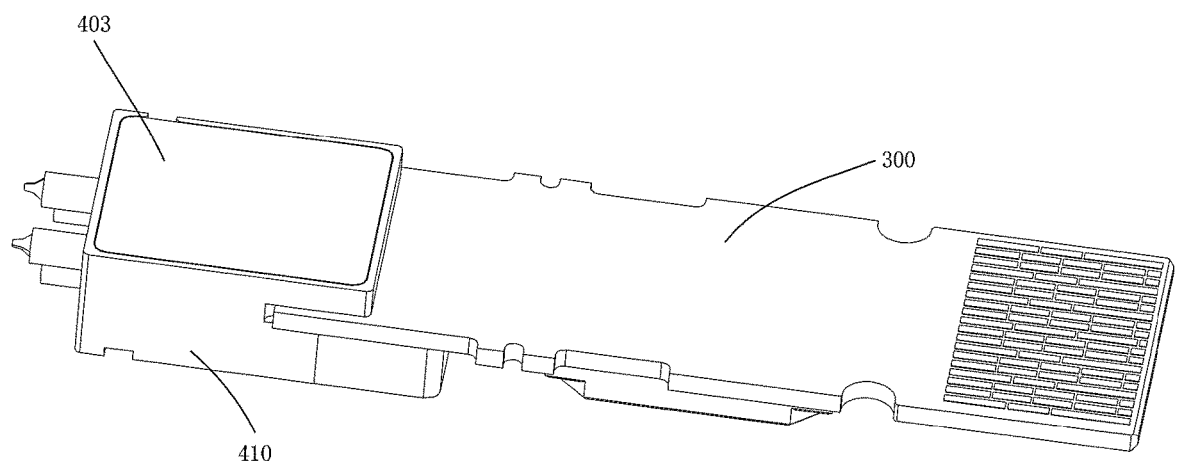
FIG. 17 is a schematic diagram from yet another angle of view for an optical sub-module assembled with a circuit board in an optical module according to an embodiment of the present disclosure.
Figure 18:
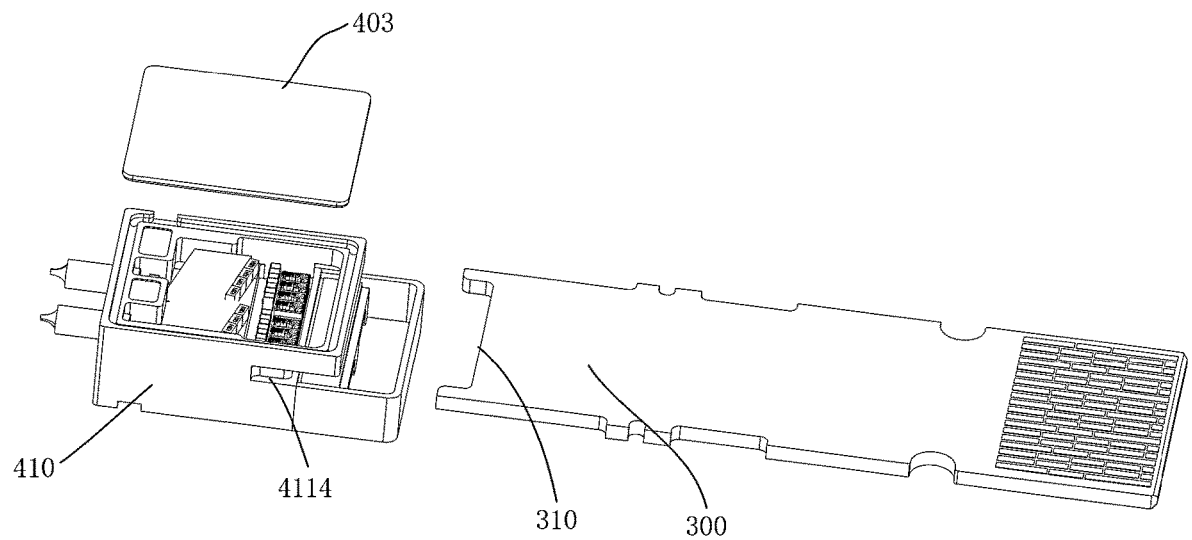
FIG. 18 is an exploded diagram from another angle of view for an optical sub-module assembled with a circuit board in an optical module according to an embodiment of the present disclosure.

FIG. 16 is a schematic assembly diagram from another angle of view for the circuit board 300 and the optical sub-module 400 in an optical module according to an embodiment of the present disclosure, FIG. 17 is a schematic assembly diagram from a further angle of view for the circuit board 300 and the optical sub-module 400 in an optical module according to an embodiment of the present disclosure, and FIG. 18 is a schematic partial exploded diagram of the circuit board 300 and the optical sub-module 400 in an optical module according to an embodiment of the present disclosure. As shown in FIG. 16, FIG. 17, and FIG. 18, a light-emitting cavity and a light-emitting cover 403 are provided at the lower portion of the housing assembly 410, wherein the light-emitting cover 403 covers the light-emitting cavity from below, and photoelectric devices related to light-emitting, such as lenses and light-emitting chips, are provided within the light-emitting cavity. The first notch 4114 is provided at the side of the housing assembly 410 facing towards the circuit board 300, the circuit board 300 is inserted into the housing assembly 410 through the first notch 4114, a pad is provided on the lower surface of the circuit board, and the light-emitting assembly is connected to the pad through wires, so that the electrical devices such as light-emitting chips disposed within the light-emitting cavity are electrically connected with the circuit board 300 to drive the light-emitting chip so as to realize electro-optical conversion.

In the optical module provided by the embodiments of the present disclosure, the light-emitting assembly in the optical sub-module 400 is used to emit signal lights of multiple different wavelengths, and the signal lights of different wavelengths achieve light multiplexing through optics such as a wavelength division multiplexing component (MUX) in the light-emitting cavity, and the combined, multiplexed light beam is transmitted to the external optical fiber through the optical fiber adapter to realize an emission of signal light. Typically, one light-emitting chip is used to emit signal light of one wavelength, and the light-emitting assembly according to the embodiment of the present disclosure comprises a plurality of light-emitting chips to form a chip array. For example, when the light-emitting assembly is used to emit signal lights of four different wavelengths, the light-emitting assembly comprises four light-emitting chips for correspondingly emitting signal lights of four different wavelengths; when the light-emitting assembly is used to emit signal lights of eight different wavelengths, the light-emitting assembly comprises eight light-emitting chips for correspondingly emitting signal lights of eight wavelengths.

Figure 19:
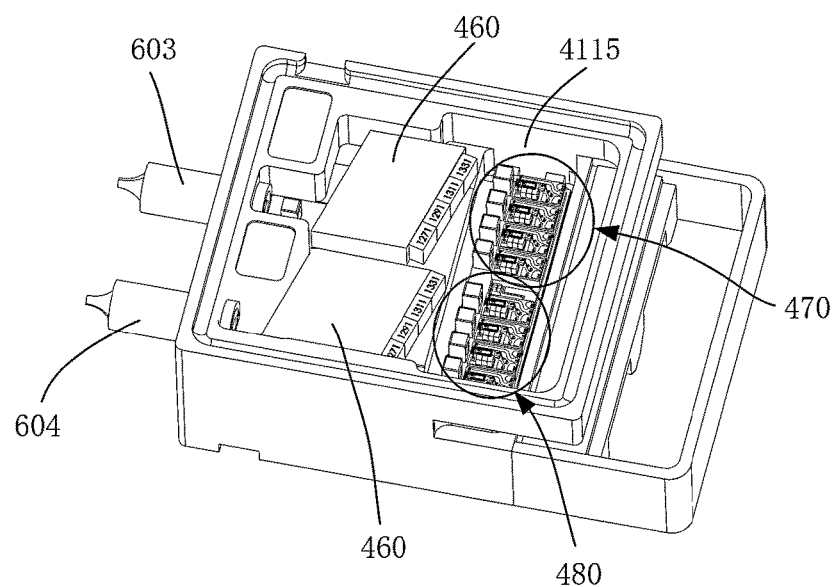
FIG. 19 is a schematic partial structural diagram from another angle of view for an optical sub-module in an optical module according to an embodiment of the present disclosure.

FIG. 19 is another schematic structural diagram of a housing assembly 410 in an optical module according to an embodiment of the present disclosure. As shown in FIG. 19, in the light-emitting assembly in the optical sub-module 400, the light-emitting cavity 4115 houses/accommodates optical devices such as the wavelength division multiplexing component 460, and the light beams of multiple different wavelengths emitted by the light-emitting chips are transmitted to the wavelength division multiplexing component 460, which multiplexes light beams of multiple different wavelengths into a composite, multiplexed light beam which is transmitted into an external optical fiber through an optical fiber adapter.

In the embodiments of the present disclosure, four light input ports for incident signal lights of multiple wavelengths are provided the on the right side of the wavelength division multiplexing component 460, and one light output port for emitting light is provided on the left side; each light input port is used for incident signal light of one wavelength. In some embodiments of the present disclosure, signal lights of multiple different wavelengths enter the wavelength division multiplexing component 460 through corresponding light input ports, wherein one beam of signal light is reflected six times at six different positions of the wavelength division multiplexing component 460 before reaching the light output port, one beam of signal light is reflected four times at four different positions of the wavelength division multiplexing component 460 before reaching the light output port, one beam of signal light is reflected twice at two different positions of the wavelength division multiplexing component 460 before reaching the light output port, and one beam of signal light is incident onto the wavelength division multiplexing component 460 and then directly transmitted to the light output port. In this way, the wavelength division multiplexing component realizes that signal lights of different wavelengths enter the wavelength division multiplexing component via different light input ports, and are output via the same light output port, thereby obtaining a beam consisted of signal lights of different wavelengths. In the embodiments of the present disclosure, the wavelength division multiplexing component is not limited to a beam multiplexing of four wavelengths, and can be designed according to actual needs.

Two groups of light-emitting assemblies are integrated in the optical sub-module 400 according to an embodiment of the present disclosure, and a light-emitting cavity 4115 is provided in the lower part of the housing assembly 410, converging lens, wavelength division multiplexing components 460, and light-emitting assemblies are provided in the light-emitting cavity 4115; an optical fiber adapter is provided on the left side of the housing assembly 410, and the optical fiber adapter is communicated with the light-emitting cavity 4115. The wavelength division multiplexing component 460 is disposed at a side of the light-emitting cavity 4115 approximate to the optical fiber adapter, the light-emitting assembly is disposed at a side of the light-emitting cavity 4115 close to the circuit board 300, and the converging lens is disposed between the optical fiber adapter and the wavelength division multiplexing component 460. Signal lights of multiple different wavelengths emitted by the light-emitting assembly are thereby transmitted to the wavelength division multiplexing component 460, the multiple light beams of different wavelengths are multiplexed into a composite, multiplexed light beam via the wavelength division multiplexing component 460, and the multiplexed light beam is coupled to the optical fiber adapter via the converging lens, thereby realizing an emission of lights of multiple different wavelengths.

Figure 20:
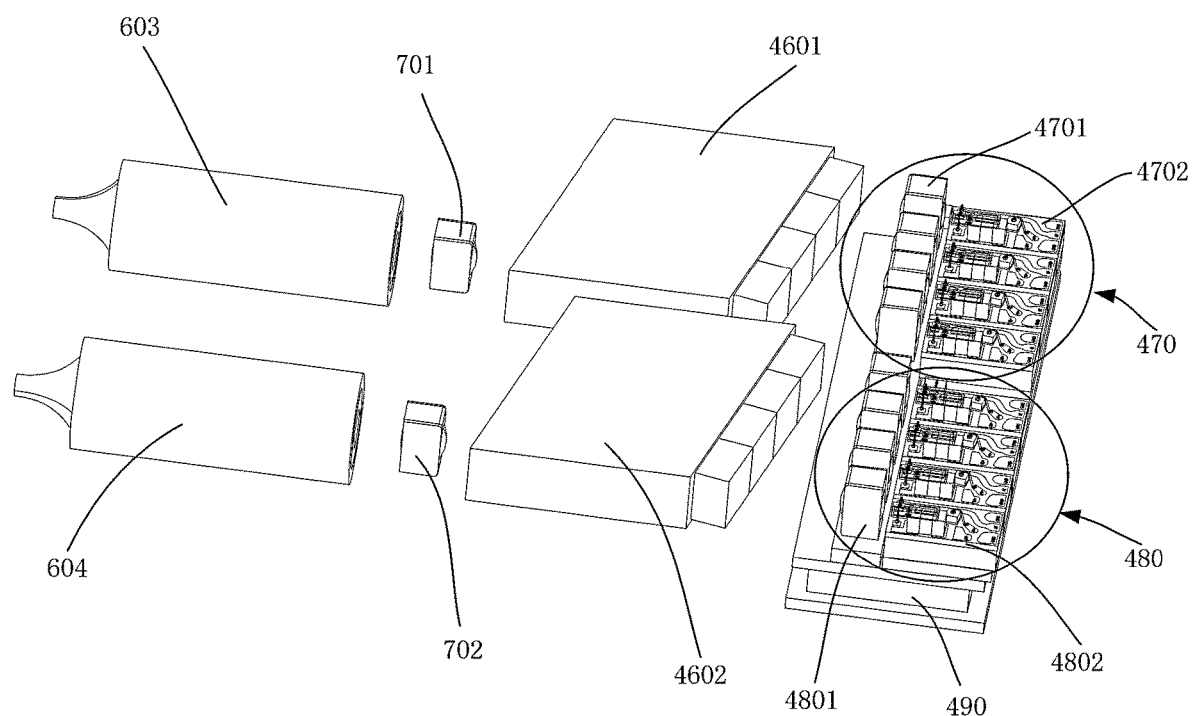
FIG. 20 is a schematic structural diagram of a light-emitting assembly in an optical module according to an embodiment of the present disclosure.
Figure 21:
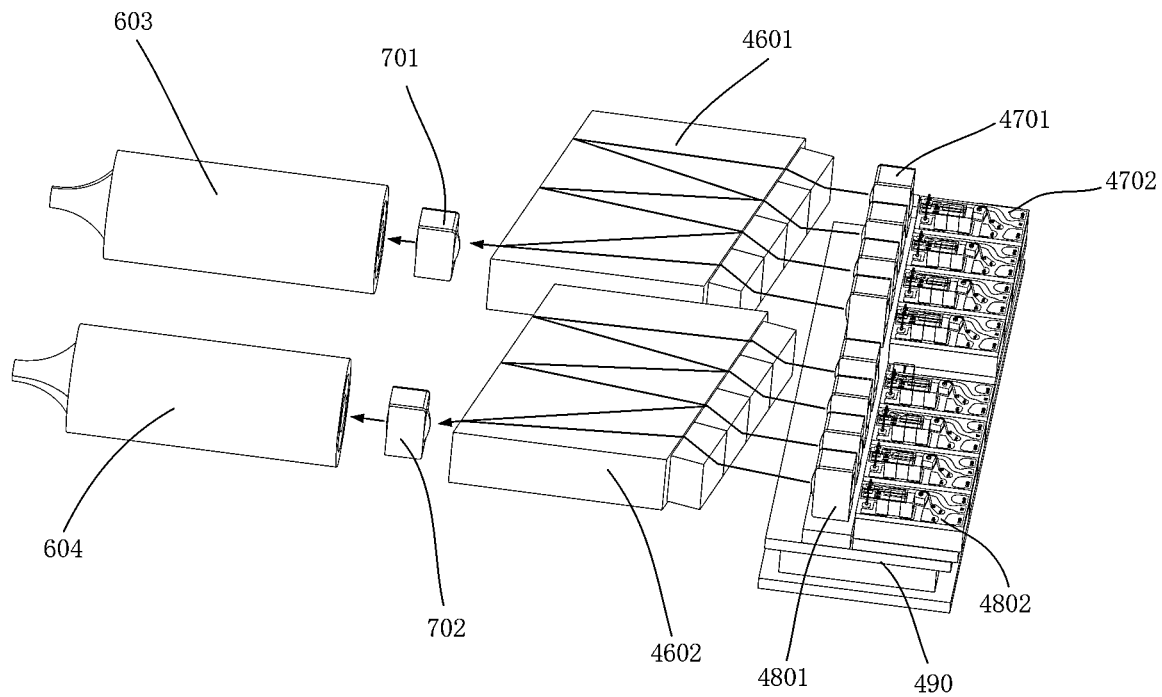
FIG. 21 is a schematic diagram showing an optical path of a light-emitting assembly in an optical module according to an embodiment of the present disclosure.

FIG. 20 is a schematic structural diagram of a light-emitting assembly in an optical sub-module 400 in an optical module according to an embodiment of the present disclosure, and FIG. 21 is a schematic diagram of an optical path of the light-emitting assembly in an optical module according to an embodiment of the present disclosure. As shown in FIG. 20 and FIG. 21, the light-emitting cavity 4115 comprises a top plate provided at the top of the cavity and side plates surrounding the top plate. The top plate and the side plates form a cavity structure for accommodating the wavelength division multiplexing component 460 and the light transmitting components. The light transmitting components comprises a first light-emitting assembly 470 and a second light-emitting assembly 480 that are provided at the side of the light-emitting cavity 4115 approximate to the circuit board 300, and are electrically connected to the circuit boards 300, respectively. The wavelength division multiplexing component 460 provided in the light-emitting cavity 4115 comprises a first wavelength division multiplexing component 4601 and a second wavelength division multiplexing component 4602, and a third optical fiber adapter 603 and a fourth optical fiber adapter 604 is provided at the left side of the housing assembly 410; the third optical fiber adapter 603 extends into the light-emitting cavity 4115, and a first convergence lens 701 is provided between the third optical fiber adapter 603 and the first wavelength division multiplexing component 4601; a second converging lens 702 is provided between the fourth optical fiber adapter 604 and the second wavelength division multiplexing components 4602. In this way, signal lights of four different wavelengths emitted by the first light-emitting assembly 470 are transmitted to the first wavelength division multiplexing component 4601, and the four beams of signal light of different wavelengths are multiplexed into a composite, multiplexed beam via the first wavelength division multiplexing component 4601; the multiplexed light beam is converged and coupled to the third optical fiber adapter 603 via the first converging lens 701. Similarly, signal lights of four different wavelengths emitted by the second light-emitting assembly 480 are transmitted to the second wavelength division multiplexing component 4602, and the four beams of signal light of different wavelengths are multiplexed into a composite, multiplexed beam via the second wavelength division multiplexing component 4602; the composite light beam is converged and coupled to the fourth optical fiber adapter 604 via the second converging lens 702.

The first optical fiber adapter and the third optical fiber adapter are provided at different levels. The second optical fiber adapter and the fourth optical fiber adapter are provided at different levels.

In the embodiments of the present disclosure, the first light-emitting assembly 470 and the second light-emitting assembly 480 comprise a plurality of light-emitting chips, respectively, and the light-emitting chips are laser chips for converting a current signal into laser light for emission. In some embodiments of the present disclosure, the first light-emitting assembly 470 comprises a third lens assembly 4701 and a first laser assembly 4702 for emitting multiple signal light beams of different wavelengths; the third lens assembly 4701 is provided in a light emission direction from the first laser assembly 4702 for converting the beam emitted by the first laser assembly 4702 into a collimated beam; the first wavelength division multiplexing component 4601 is disposed in a light emission direction from the third lens assembly 4701 for multiplexing multiple beams of different wavelengths into a composite, multiplexed beam; the first converging lens 701 is disposed in the light emission direction from the first wavelength division multiplexing component 4601, in order that a multiplexed beam emitted by the first wavelength division multiplexing component 4601 may be converged and coupled into the third fiber adapter 603 for emission.

Similarly, the second light-emitting assembly 480 comprises a fourth lens assembly 4801 and a second laser assembly 4802 for emitting multiple signal light beams of different wavelengths, and the fourth lens assembly 4801 is provided in the light emission direction from the second laser assembly 4802 for converting the beam emitted by the second laser assembly 4802 into a collimated beam; the second wavelength division multiplexing component 4602 is disposed in the light emission direction from the fourth lens assembly 4801 for multiplexing multiple beams of different wavelengths into a composite, multiplexed beam; the second converging lens 702 is disposed in the light emission direction from the second wavelength division multiplexing component 4602, in order that the multiplexed beam emitted by the second wavelength division multiplexing component 4601 is converged and coupled into the fourth fiber adapter 604 for emission.

In the embodiments of the present disclosure, the first laser assembly 4702 may comprise four lasers, the third lens assembly 4701 may comprise four collimating lenses, with the four lasers being provided in a one-to-one correspondence with the four collimating lenses, such that the four lasers emit four beams of different wavelengths, respectively, which are respectively transmitted to the corresponding collimating lenses. Correspondingly, the second laser assembly 4802 may comprise four lasers, the fourth lens assembly 4801 may comprise four collimating lenses, with the four lasers being provided in a one-to-one correspondence with the four collimating lenses, such that the four lasers emit four beams of different wavelengths, respectively, which are respectively transmitted to the corresponding collimating lenses.

The first wavelength division multiplexing component 4601 and the second wavelength division multiplexing component 4602 both comprise four input channels; the four collimated light beams output from the four collimating lenses of the third lens assembly 4701 enter the four input channels of the first wavelength division multiplexing component 4601, respectively. The first wavelength division multiplexing component 4601 converts the collimated beams of the four channels into a composite, multiplexed beam that is converged and coupled to the third fiber adapter 603 through the first converging lens 701, so as to achieve an emission of a 4-channel wavelength division multiplexed light. Similarly, the four collimated light beams output from the four collimating lenses of the fourth lens assembly 4702 enter the four input channels of the second wavelength division multiplexing component 4602, respectively. The second wavelength division multiplexing component 4602 converts the collimated beams of the four channels into a composite, multiplexed beam that is converged and coupled to the fourth fiber adapter 604 through the second converging lens 702, so as to achieve an emission of a 4-channel wavelength division multiplexed light. In this way, the present disclosure multiplexes the 8-channel light beams into two composite, multiplexed light beams through two wavelength division multiplexing components and couples the two multiplexed light beams into the two optical fiber adapters respectively, thereby reducing the volume occupied by the light-emitting assembly in the optical module, which is advantageous for a miniaturization of optical modules.

In the embodiments of the present disclosure, in order to realize the emission optical path of the above-mentioned embodiment, it is necessary to provide a platform for device supporting and coupling for the first light-emitting assembly 470, the first wavelength division multiplexing component 4601, the second light-emitting assembly 480 and the second wavelength division multiplexing component 4602, so as to realize a passive coupling of the first light-emitting assembly 470 with the first wavelength division multiplexing component 4601 as well as a passive coupling of the second light-emitting assembly 480 with the second wavelength division multiplexing component 4602, thus reduce a coupling difficulty of the emission optical path.

Figure 22:
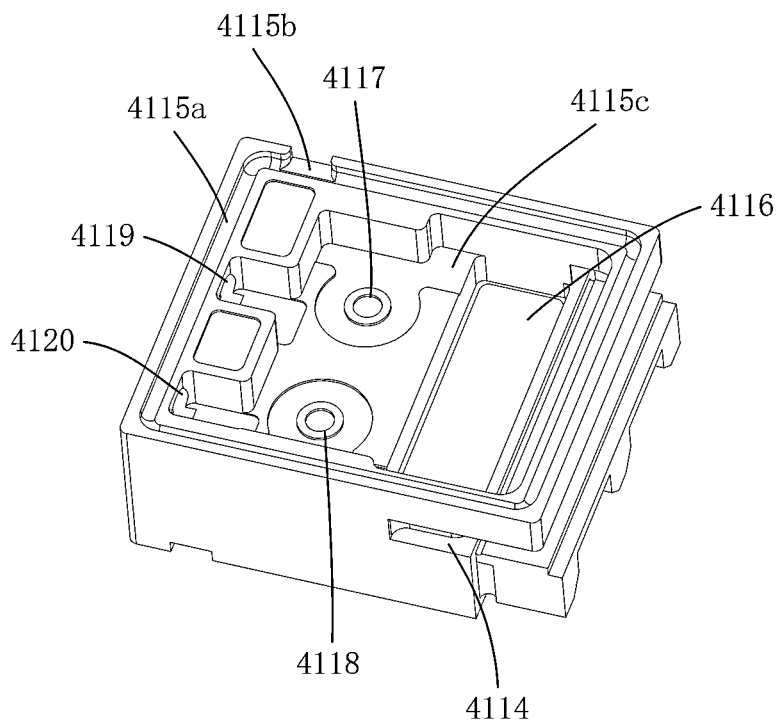
FIG. 22 is a schematic structural diagram from another angle of view for a housing assembly in an optical module according to an embodiment of the present disclosure.

FIG. 22 is a schematic structural diagram from another angle of view for a housing assembly 410 in an optical module according to an embodiment of the present disclosure. As shown in FIG. 22, a first top surface 4115c and a second top surface 4116 are formed on the top plate of the light-emitting cavity 4115 that is formed in the lower part of the housing assembly 410, and a step is formed between the first top surface 4115c and the second top surface 4116, that is, there is a height difference between the first top surface 4115c and the second top surface 4116, and the second top surface 4116 is positioned at a level higher than the first top surface 4115c. A first MUX fixing glue groove 4117 and a second MUX fixing glue groove 4118 are provided on the first top surface 4115c; the top surface of the light-emitting cavity forms MUX fixing glue grooves having an annular, protuberant circumference on which the wavelength division multiplexing component is disposed. Glue is provided into the groove enclosed by the annular, protuberant circumference for adhering the wavelength division multiplexing component. The first wavelength division multiplexing component 4601 is fixed on the first top surface 4115c by means of the first MUX fixing glue groove 4117, and the second wavelength division multiplexing component 4602 is fixed on the first top surface 4115c by means of the second MUX fixing glue groove 4118. In some embodiments of the present disclosure, the first MUX fixing glue groove 4117 is used for dispensing glue. When the first wavelength division multiplexing component 4601 needs to be fixed, glue is dispensed into the first MUX fixing glue groove 4117, and then the first wavelength division multiplexing component 4601 is placed and arranged into the first MUX fixing glue groove 4117, and a fixing of the first wavelength division multiplexing component 4601 on the first top surface 4115c is achieved when the glue solidifies. Similarly, the second MUX fixing glue groove 4118 is used for dispensing glue. When the second wavelength division multiplexing component 4602 needs to be fixed, glue is dispensed into the second MUX fixing glue groove 4118, and then the second wavelength division multiplexing component 4602 is placed and arranged into the second MUX fixing glue groove 4118, and a fixing of the second wavelength division multiplexing component 4602 on the first top surface 4115c is achieved when the glue solidifies.

The second top surface 4116 is provided for carrying the first light-emitting assembly 470 and the second light-emitting assembly 480. In order to ensure that a height of the emission channel of the first laser assembly 470 is the same/consistent with a height of the input channel of a wavelength division multiplexing component 4601, and a height of the emission channel of the second laser assembly 480 is the same/consistent with a height of the input channel of the second wavelength division multiplexing component 4602, a semiconductor refrigerator 490 is provided on the second top surface 4116, a top surface (upper surface) of the semiconductor refrigerator 490 is affixed onto the second top surface 4116, and a bottom surface (lower surface) thereof is configured to support and secure the first light-emitting assembly 470 as well as the second light-emitting assembly 480, so that heat generated by the first light-emitting assembly 470 and the second light-emitting assembly 480 may be conducted/transferred to the semiconductor refrigerator 490, thus realizing an effective heat dissipation of the light-emitting assembly.

The step between the first top surface 4115c and the second top surface 4116 realizes a height difference in the top surface of the light-emitting cavity 4115. On one hand, by the step formed between the first top surface 4115c and the second top surface 4116, a mounting surface for the semiconductor refrigerator 490 may be lifted by the second top surface 4116, thereby lifting the first light-emitting assembly 470 and the second light-emitting assembly 480, so as to facilitate an assembly of the first light-emitting assembly 470, the first wavelength division multiplexing component 4601, the second light-emitting assembly 480, and the second wavelength division multiplexing component 4602; on the other hand, the step can also be used for limiting the position of the semiconductor refrigerator 490.

The notch 4114 is provided at a side of the housing assembly 410 approximate to the circuit board 300, which is wrapped around an outside of the second top surface 4116; a third notch 310 is provided in the circuit board 300, at a side facing towards the housing assembly 410; when the circuit board 300 is inserted into the first notch 4114 of the housing assembly 410, the two side walls of the third notch 310 wrap around/engage with the second top surface 4116, so that a distance between the light-emitting assembly and the circuit board 300 can be shortened. When the first laser assembly 4702 and the second laser assembly 4802 are electrically connected to the circuit board 300 by wire bonding, the length of the wiring between the first laser assembly 4702, the second laser assembly 4802 and the circuit board 300 may be reduced.

Figure 23:
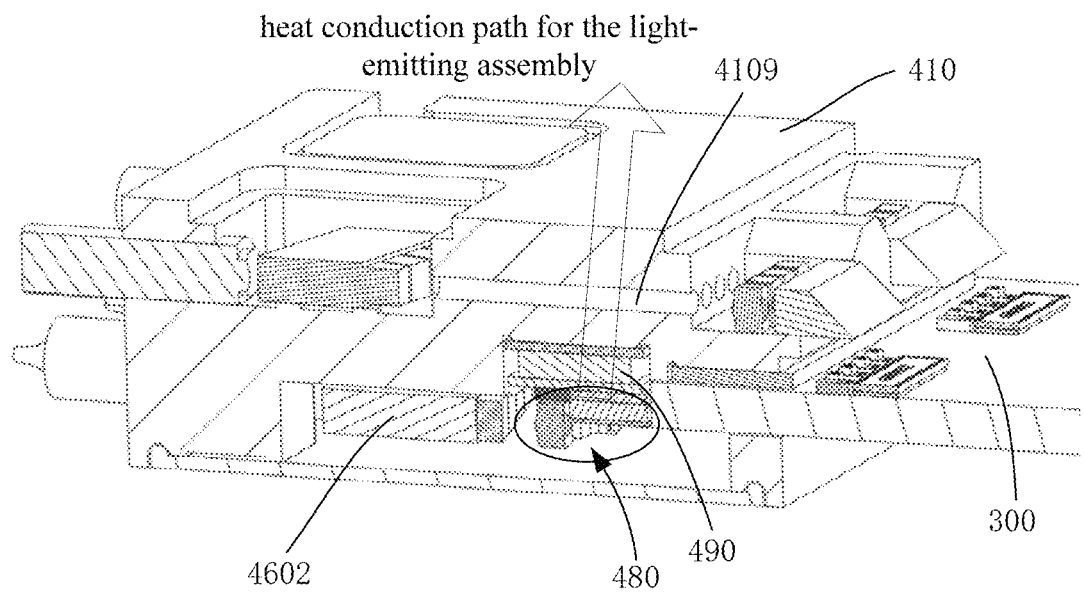
FIG. 23 is a cross-sectional view of a light-emitting assembly assembled in a housing assembly of an optical module according to an embodiment of the present disclosure.

FIG. 23 is a cross-sectional view of an assembly of a light-emitting assembly and a housing assembly 410 in an optical module according to an embodiment of the present disclosure. As shown in FIG. 23, the second top surface 4116 is located below the light-passing holes 4109 of the housing assembly 410, one side face (top surface) of the semiconductor refrigerator 490 is affixed to the second top surface 4116, the first light-emitting assembly 470 and the second light-emitting assembly 480 are all affixed to the other side face (bottom surface) of the semiconductor refrigerator 490. The first light-emitting assembly 470 and the second light-emitting assembly 480 use a total of eight lasers. Heat generated by the lasers is conducted to the semiconductor refrigerator 490. The heat from the semiconductor refrigerator 490 may turn away from/bypass the light-passing holes 4109, and is conducted to the upper surface of the housing assembly 410 from regions where no drillings are formed in the housing assembly 410, and is then conducted to the casing of the optical module through thermally conductive material for heat dissipating.

In the embodiments of the present disclosure, the light-emitting assembly is disposed underneath the partition wall of the housing assembly, with the partition wall being provided above the top surface of the light-emitting cavity and jointed with the top surface of the light-emitting cavity;

the light-passing holes 4109 are provided in the partition wall. A heat conduction for the light-emitting assembly may be realized via the partition wall, and the partition wall is the heat conduction path for the light-emitting assembly. The partition wall realizes a separation of the light-receiving cavity and the slot in the light-receiving portion and a connection thereof via the partition wall. In order to obtain a light path between the light-receiving cavity and the slot, light-passing holes are provided in the partition wall. The light beam demultiplexed and output from the wavelength division multiplexing component at the light-receiving end is transmitted to the lens assembly, and each beam output from the wavelength division multiplexing component is conducted to a corresponding collimating lens through a light-passing hole 4109.

In order to facilitate a heat conduction of the light-emitting assembly, the upper and lower portions of the housing assembly 410 are integrated together, so that heat generated in the light-emitting end can be conducted via the housing assembly 410 (for example conducted to the upper surface of the housing assembly via the partition wall), and is then conducted to the casing of the optical module through thermally conductive material for heat dissipation, as shown by the arrow, which improves a heat dissipation efficiency of the light-emitting end.

At the side of the housing assembly 410 approximate to the optical fiber adapter are provided a third through hole 4119 and a fourth through hole 4120 which are both communicated with the light-emitting cavity 4115. The third optical fiber adapter 603 is inserted into the light-emitting cavity 4115 through the third through hole 4119, for receiving a convergent beam output from the first focusing lens 701; the fourth optical fiber adapter 604 is inserted into the light-emitting cavity 4115 through the fourth through hole 4120, for receiving the convergent beam output from the two convergent lens 702.

In the embodiments of the present disclosure, the light-emitting cavity 4115 comprises a top plate and side plates surrounding the top plate. The top plate and the side plates form a cavity structure for holding the first light-emitting assembly 470, the first wavelength division multiplexing component 4601, the first converging lens 701, the second light-emitting assembly 480, the second wavelength division multiplexing component 4602 and the second converging lens 702. At the bottom of the side plates of the light-emitting cavity 4115 is provided a third cover fixing glue groove 4115a, such that the cover 403 may be in turn fixedly secured onto the light-emitting cavity 4115 by glue. In some embodiments of the present disclosure, the third cover fixing glue groove 4115 forms a closed-loop structure at the bottom of the side plate of the light-emitting cavity 4115, thereby an adhesive area for the third cover 403 onto the bottom of the side plates of the light-emitting cavity 4115 may be increased, so that the packaging reliability of the third cover 403 and the bottom of the side plates of the light-emitting cavity 4115 may be well guaranteed. In some embodiments of the present disclosure, at the bottom of the side plates of the light-emitting cavity 4115 is further provided a third repairing opening 4115b which is provided at the edge on the bottom of the side plate of the light-emitting cavity 4115 and is communicated with the third cover fixing glue groove 4115a. When the devices inside the light-emitting cavity 4115 need to be repaired after the third cover 403 and the light-emitting cavity 4115 were packaged, the third cover 403 can be disassembled from the light-emitting cavity 4115 via the third repairing opening 4115b, and then the third cover 403 can be removed without damaging the third cover 403 or the light-emitting cavity 4115, thereby reducing the difficulty and cost of repairing.

The optical module according to the embodiment of the present disclosure utilizes an integrated metal housing assembly. The housing assembly is opened from the upper and lower surfaces for arranging the light-emitting assembly and the light-receiving assembly respectively, and the light-emitting assembly and the light-receiving assembly are placed/stacked one above the other; that is, the light-emitting assembly and the light-receiving assembly share the separation board in the middle of the housing assembly, with the light-receiving assembly being disposed on the upper side of the separation board, and the light-emitting assembly being disposed on the lower side of the separation board; one end of the circuit board is inserted into the housing assembly; high-frequency wirings of the light-emitting assembly and the light-receiving assembly are respectively routed on the upper and lower surface of the circuit board to avoid cross effects. The integrated structure of the light-emitting assembly and the light-receiving assembly can solve the problem of insufficient overall space of an optical module using discrete light-emitting assembly and the light-receiving assembly, and is beneficial for a miniaturization of the optical module.

Finally, it should be noted that the foregoing embodiments are merely intended to describe the technical solutions of the present disclosure, and shall not be construed as limitation. Although the present disclosure is described in detail with reference to the foregoing embodiments, one of ordinary skills in the art may understand that modifications still may be made to the technical solutions disclosed in the foregoing embodiments, or equivalent replacements may be made to some of the technical features. However, these modifications or equivalent replacements do not deviate the nature of corresponding technique solutions from the spirit and scope of the technique solutions of the embodiments of the present disclosure.

What is claimed is:

1. An optical module, comprising:
   a circuit board;
   a housing assembly into which the circuit board is inserted, which is divided by a separation board into a first portion and a second portion that are stacked one above the other, wherein a light-emitting cavity is formed in the second portion, and a partition wall is provided in the first portion to separate the first portion into a light-receiving cavity and a slot that is arranged approximate to the circuit board, wherein the partition wall is provided with a plurality of light-passing holes via which the light-receiving cavity is in communication with the slot;
   an optical fiber adapter, which is arranged in the housing assembly at a side away from the circuit board, and is in communication with the light-receiving cavity;
   a light-emitting assembly, which is arranged in the light emitting cavity and is electrically connected to the circuit board, wherein heat generated by the light-emitting assembly is conducted to a surface of the housing assembly via the partition wall; and
   a light-receiving assembly, which comprises a wavelength-division multiplexing component, a lens array and a light-receiving chip, wherein the wavelength-division multiplexing component is arranged in the light-receiving cavity for demultiplexing a multiplexed beam transmitted by the optical fiber adapter into multiple beams of different wavelengths and transmitting the demultiplexed multiple beams to the lens array through respective light-passing holes; wherein the lens array is arranged in the slot for converging the multiple beams transmitted through the light-passing holes onto the light-receiving chip; wherein the light-receiving chip is arranged on an end surface of the circuit board that is inserted within the housing assembly for receiving the converged beams and converting them into a current signal.

2. The optical module according to claim 1, wherein the light-receiving cavity comprises a first light-receiving cavity, and the slot comprises a first slot, with the first light-receiving cavity being in communication with the first slot via the light-passing holes; the optical fiber adapter comprises a first optical fiber adapter that is in communication with the first light-receiving cavity;

the light-receiving assembly comprises a first light-receiving assembly, wherein the first light-receiving assembly comprises a first wavelength division multiplexing component, a first lens array and a first light-receiving chip, wherein the first wavelength division multiplexing component is arranged in the first light-receiving cavity for demultiplexing a multiplexed beam transmitted by the first optical fiber adapter into multiple beams of different wavelengths and transmitting the multiple beams to the first lens array through corresponding light-passing holes; wherein the first lens array is arranged in the first slot for converging the multiple beams transmitted through the light-passing holes onto the corresponding first light-receiving chip; wherein the first light-receiving chip is arranged on the end surface of the circuit board that is inserted within the housing assembly.

3. The optical module according to claim 2, wherein a first collimating lens is further provided in the first light-receiving cavity, and is arranged between the first optical fiber adapter and the first wavelength division multiplexing component for converting the multiplexed light beam transmitted by the first optical fiber adapter into a collimated light beam and transmitting the collimated light beam to the first wavelength division multiplexing component.

4. The optical module according to claim 3, wherein the first light-receiving assembly further comprises a first reflecting prism, which is arranged in the first slot and caps the first light-receiving chip from above, for reflecting the light beams output from the first lens array to the corresponding first light-receiving chip.

5. The optical module according to claim 2, wherein the light-receiving cavity further comprises a second light-receiving cavity, and the slot further comprises a second slot; the second light-receiving cavity and the first light-receiving cavity are arranged side by side in a width direction of the housing assembly; the second slot and the first slot are arranged side by side in the width direction of the housing assembly; wherein the second light-receiving cavity is in communication with the second slot via the light-passing holes; the optical fiber adapter further comprises a second optical fiber adapter that is in communication with the second light-receiving cavity;

the light-receiving assembly further comprises a second light-receiving assembly, wherein the second light-receiving assembly comprises a second wavelength division multiplexing component, a second lens array and a second light-receiving chip, wherein the second wavelength division multiplexing component is arranged in the second light-receiving cavity for demultiplexing a multiplexed beam transmitted by the second optical fiber adapter into multiple beams of different wavelengths and transmitting the multiple beams to the second lens array through corresponding light-passing holes; wherein the second lens array is arranged in the second slot for converging the multiple beams transmitted through the light-passing holes onto the corresponding second light-receiving chip; wherein the second light-receiving chip is arranged on the end surface of the circuit board that is inserted within the housing assembly.

6. The optical module according to claim 5, wherein a second collimating lens is further provided in the second light-receiving cavity, and is arranged between the second optical fiber adapter and the second wavelength division multiplexing components for converting the multiplexed light beam transmitted by the second optical fiber adapter into a collimated light beam and transmitting the collimated light beam to the second wavelength division multiplexing component.

7. The optical module according to claim 6, wherein the second light-receiving assembly further comprises a second reflection prism, which is arranged in the second slot and caps the second light-receiving chip from above, for reflecting the light beams output from the second lens array to the corresponding second light-receiving chip.

8. The optical module according to claim 1, further comprising a covering hood that caps the slot from above, wherein a lower side of the covering hood is opened towards and is in contact with an upper surface of the circuit board.

9. The optical module according to claim 1, wherein a first notch is provided at a side of the housing assembly proximate to the circuit board, wherein the first notch is arranged below the slot, and the circuit board is inserted into the housing via the first notch.

10. The optical module according to claim 9, wherein a second notch is provided between the first notch and the slot, with an aluminum nitride ceramic substrate being arranged in the second notch, wherein gaps between the aluminum nitride ceramic substrate and the housing assembly and gaps between the aluminum nitride ceramic substrate and the circuit board are filled with insulating high thermal conductivity glue.

11. An optical module, comprising:
a circuit board;
a housing assembly, which is divided by a separation board into a light-receiving portion and a light-emitting cavity that are stacked one above the other, wherein the light-receiving portion is provided with a plurality of light-passing holes, wherein the circuit board is inserted into the housing assembly;
an optical fiber adapter, which is arranged in the housing assembly at a side away from the circuit board, and is in communication with the light-emitting cavity;
a light-receiving assembly, which is arranged in the light-receiving portion and is electrically connected with the circuit board; and
a light-emitting assembly, which is arranged in the light-emitting cavity and is electrically connected to the circuit board; wherein the light-emitting assembly comprises a wavelength division multiplexing component, a lens array and a laser assembly, and the laser assembly, the lens array and the wavelength division multiplexing component are disposed in sequence along a light-emitting path, wherein the laser assembly is arranged underneath the light-passing holes for emitting multiple beams of different wavelengths; wherein the lens array is configured to convert the multiple beams into multiple collimated beams; the wavelength division multiplexing component is configured to multiplex multiple collimated beams into a multiplexed beam and to couple the multiplexed beam to the optical fiber adapter.

12. The optical module according to claim 11, wherein a first laser assembly, a third lens array, a first wavelength division multiplexing component, a second laser assembly, a fourth lens array and a second wavelength division multiplexing component are provided in the light-emitting cavity; wherein the first wavelength division multiplexing component and the second wavelength division multiplexing component are arranged in parallel, the first laser assembly, the third lens array and the first wavelength division multiplexing component are disposed in sequence along the light-emitting path, and the second laser assembly, the fourth lens array and the second wavelength division multiplexing component are disposed in sequence along the light-emitting path;
 a third optical fiber adapter and a fourth optical fiber adapter are provided at the side of the housing assembly away from the circuit board, with the third optical fiber adapter being disposed on an output optical path of the first wavelength division multiplexing component, and the fourth optical fiber adapter being disposed on an output optical path of the second wavelength division multiplexing component.

13. The optical module according to claim 12, wherein a top plate of the light-emitting cavity comprises a first top surface and a second top surface which is arranged above the first top surface and underneath the light-passing holes;
 the first laser assembly, the third lens array, the second laser assembly and the fourth lens array are all fixed on the second top surface, and the first wavelength division multiplexing component and the second wavelength division multiplexing components are both fixed on the first top surface.

14. The optical module according to claim 13, wherein a semiconductor refrigerator is provided on the second top surface, with a top surface of the semiconductor refrigerator being adhered to the second top surface; wherein the first laser assembly, the third lens array, the second laser assembly and the fourth lens array are all fixed on a bottom surface of the semiconductor refrigerator, so that an emission channel of the first laser assembly is at the same level with an input channel of the first wavelength division multiplexing component, and an emission channel of the second laser assembly is at the same level with an input channel of the second wavelength division multiplexing component.

15. The optical module according to claim 13, wherein a first MUX fixing glue groove and a second MUX fixing glue groove are provided on the first top surface, wherein the first wavelength division multiplexing component is fixed on the first top surface via the first MUX fixing glue groove, and the second wavelength division multiplexing component is fixed on the first top surface via the second MUX fixing glue groove.

16. The optical module according to claim 11, wherein the light-receiving portion comprises a light-receiving cavity and a slot that is approximate to the circuit board, and a plurality of light-passing holes are provided between the light-receiving cavity and the slot.

17. An optical module, comprising:
 a circuit board, an upper surface of which is provided with a light-receiving chip, and a lower surface of which is provided with a pad;
 a housing assembly, an upper surface of which is downwardly recessed to form a light-receiving cavity and a slot, with a partition wall being provided between the light-receiving cavity and the slot, wherein the partition wall is provided with light-passing holes to communicate the light-receiving cavity with the slot; wherein a lower surface of the housing assembly is upwardly recessed to form a light-emitting cavity;
 a first optical fiber adapter, which is arranged at one end of the light-receiving cavity;
 a third optical fiber adapter, which is arranged at one end of the light-emitting cavity, with a notch being provided at the other end of the light-emitting cavity;
 a light-emitting assembly, which is arranged in the light-emitting cavity and is configured to transmit lights to the third optical fiber adapter; wherein one end of the circuit board protrudes into the light-emitting cavity via the notch; the pad is arranged in the light-emitting cavity and is connected with the light-emitting assembly by wires;
 an optical component, which is arranged in the light-receiving cavity and is configured to receive lights from the first optical fiber adapter;
 a reflective mirror, which is disposed at the slot and reflects lights from the optical component; and
 a light-receiving chip, which is arranged between the reflective mirror and the circuit board and is located outside the housing assembly, and is configured to receive lights from the reflective mirror.

18. The optical module according to claim 17, wherein the light-emitting assembly is arranged on a top surface of the light-emitting cavity above which the partition wall is provided.

19. The optical module according to claim 17, further comprising a covering hood; wherein the housing assembly further comprises a first cover and a third cover;
 wherein one end of the covering hood is connected with the partition wall, the other end thereof is in cooperation with the circuit board, and the covering hood caps the slot and the light-receiving chip from above;
 wherein the first cover covers the light-receiving cavity, and the third cover covers the light-emitting cavity.

20. The optical module according to claim 17, wherein a DeMUX fixing glue groove with an annular, protuberant circumference is formed on a bottom surface of the light-receiving cavity, wherein the wavelength division multiplexing component is disposed onto the annular, protruded circumference, wherein glue is provided into a groove enclosed by the annular, protuberant circumference for adhering the wavelength division multiplexing component.

* * * * *